(12) United States Patent
Wang et al.

(10) Patent No.: US 9,505,893 B2
(45) Date of Patent: *Nov. 29, 2016

(54) CAPS AND CLOSURES

(71) Applicant: NOVA Chemicals (International) S.A., Fribourg (CH)

(72) Inventors: XiaoChuan Wang, Calgary (CA); Tieqi Li, Calgary (CA); Christopher John Brooke Dobbin, Calgary (CA); Fazle Sibtain, Calgary (CA); Kenneth Edward Taylor, Calgary (CA); Hamidreza Khakdaman, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/919,119

(22) Filed: Oct. 21, 2015

(65) Prior Publication Data

US 2016/0108186 A1 Apr. 21, 2016

(30) Foreign Application Priority Data

Oct. 21, 2014 (CA) .................................... 2868640

(51) Int. Cl.
| C08F 210/00 | (2006.01) |
| C08J 5/00 | (2006.01) |
| B32B 3/26 | (2006.01) |
| B32B 27/32 | (2006.01) |
| C08J 5/18 | (2006.01) |
| C08L 23/08 | (2006.01) |
| C08L 23/20 | (2006.01) |

(52) U.S. Cl.
CPC .................. *C08J 5/00* (2013.01); *B32B 3/266* (2013.01); *B32B 27/327* (2013.01); *C08J 5/18* (2013.01); *C08L 23/0815* (2013.01); *C08L 23/20* (2013.01); *B32B 2307/7265* (2013.01); *B32B 2439/40* (2013.01); *C08J 2323/06* (2013.01); *C08J 2323/20* (2013.01); *C08J 2323/24* (2013.01); *C08J 2423/20* (2013.01); *C08J 2423/24* (2013.01); *C08L 2203/16* (2013.01); *C08L 2205/025* (2013.01); *C08L 2205/03* (2013.01); *C08L 2314/02* (2013.01); *C08L 2314/06* (2013.01)

(58) Field of Classification Search
CPC .......... C08J 5/00; C08J 5/18; C08J 2323/06; C08J 2323/20; C08J 2323/24; C08J 2423/20; C08J 2423/24; B32B 3/266; B32B 27/327; B32B 2307/7265; B23B 2439/40; C08L 23/0815; C08L 23/20; C08L 2203/16; C08L 2205/025; C08L 2205/03; C08L 2314/02; C08L 2314/06

See application file for complete search history.

(56) References Cited

U.S. PATENT DOCUMENTS

| 5,382,630 A | 1/1995 | Stehling et al. |
| 5,382,631 A | 1/1995 | Stehling et al. |
| 5,408,004 A | 4/1995 | Lai et al. |
| 5,519,091 A | 5/1996 | Tsutsui et al. |
| 5,530,065 A | 6/1996 | Farley et al. |
| 5,605,969 A | 2/1997 | Tsutsui et al. |
| 5,674,342 A | 10/1997 | Obijeski et al. |
| 5,677,383 A | 10/1997 | Chum et al. |
| 5,685,128 A | 11/1997 | Chum et al. |
| 5,747,594 A | 5/1998 | deGroot et al. |
| 5,773,106 A | 6/1998 | deGroot et al. |
| 5,783,638 A | 7/1998 | Lai et al. |
| 5,792,534 A | 8/1998 | deGroot et al. |
| 5,844,045 A | 12/1998 | Kolthammer et al. |
| 5,847,053 A | 12/1998 | Chum et al. |
| 5,869,575 A | 2/1999 | Kolthammer et al. |
| 5,874,139 A | 2/1999 | Bosiers et al. |
| 5,986,028 A | 11/1999 | Lai et al. |
| 6,025,448 A | 2/2000 | Swindoll et al. |
| 6,111,023 A | 8/2000 | Chum et al. |
| 6,127,484 A | 10/2000 | Cribbs et al. |
| 6,136,924 A | 10/2000 | Promel |
| 6,218,472 B1 | 4/2001 | Debras et al. |
| 6,221,982 B1 | 4/2001 | Debras et al. |
| 6,262,195 B1 | 7/2001 | Dall'Occo et al. |
| 6,306,969 B1 | 10/2001 | Patel et al. |
| 6,316,549 B1 | 11/2001 | Chum et al. |

(Continued)

FOREIGN PATENT DOCUMENTS

| EP | 0 770 629 A2 | 5/1997 |
| EP | 0 733 753 B1 | 11/1998 |

(Continued)

OTHER PUBLICATIONS

Wild, L.; Ryle, T. R.; Knobelock, D. C and Peat, I. R.; Determination of Branching Distributions in Polyethylene and Ethylene Corpolymers; Journal of Polymer Science: Polymer Physics Edition, vol. 20, (1982); pp. 441-455.

*Primary Examiner* — Nathan M Nutter
(74) *Attorney, Agent, or Firm* — Lawrence T. Kale

(57) ABSTRACT

This disclosure relates to caps and closures manufactured from an ethylene interpolymer product, or a blend containing an ethylene interpolymer product, where the ethylene interpolymer product has: a Dilution Index ($Y_d$) greater than 0; total catalytic metal ≥3.0 ppm; ≥0.03 terminal vinyl unsaturations per 100 carbon atoms, and; optionally a Dimensionless Modulus ($X_d$) greater than 0. The ethylene interpolymer products have a melt index from about 0.4 to about 20 dg/minute, a density from about 0.948 to about 0.968 g/cm³, a polydispersity ($M_w/M_n$) from about 2 to about 25 and a $CDBI_{50}$ from about 54% to about 98%. Further, the ethylene interpolymer products are a blend of at least two ethylene interpolymers; where one ethylene interpolymer is produced with a single-site catalyst formulation and at least one ethylene interpolymer is produced with a heterogeneous catalyst formulation.

108 Claims, 6 Drawing Sheets

(56) References Cited

U.S. PATENT DOCUMENTS

| | | |
|---|---|---|
| 6,346,575 B1 | 2/2002 | Debras et al. |
| 6,388,017 B1 | 5/2002 | McDaniel et al. |
| 6,403,717 B1 | 6/2002 | Adams et al. |
| 6,416,833 B1 | 7/2002 | Climenhage et al. |
| 6,433,095 B1 | 8/2002 | Laurent |
| 6,441,116 B1 | 8/2002 | Shikuma et al. |
| 6,448,341 B1 | 9/2002 | Kolthammer et al. |
| 6,462,135 B1 | 10/2002 | Rohde et al. |
| 6,462,136 B1 | 10/2002 | Saito et al. |
| 6,469,103 B1 | 10/2002 | Jain et al. |
| 6,479,589 B2 | 11/2002 | Debras et al. |
| 6,479,609 B1 | 11/2002 | Dall'Occo et al. |
| 6,489,427 B1 | 12/2002 | Clutton et al. |
| 6,506,867 B1 | 1/2003 | Lai et al. |
| 6,534,612 B1 | 3/2003 | Lai et al. |
| 6,538,070 B1 | 3/2003 | Cardwell et al. |
| 6,555,631 B1 | 4/2003 | Wang et al. |
| 6,566,446 B1 | 5/2003 | Parikh et al. |
| 6,566,450 B2 | 5/2003 | Debras et al. |
| 6,569,948 B2 | 5/2003 | Laurent |
| 6,579,922 B2 | 6/2003 | Laurent |
| 6,657,026 B1 | 12/2003 | Kimberley et al. |
| 6,683,149 B2 | 1/2004 | Jain et al. |
| 6,723,398 B1 | 4/2004 | Chum et al. |
| 6,730,751 B2 | 5/2004 | Shamshoum et al. |
| 6,780,954 B2 | 8/2004 | Lai et al. |
| 6,828,395 B1 | 12/2004 | Ehrman et al. |
| 6,844,398 B2 | 1/2005 | Shikuma et al. |
| 6,875,816 B2 | 4/2005 | DeGroot et al. |
| 6,906,141 B2 | 6/2005 | Chum et al. |
| 6,908,968 B2 | 6/2005 | Jain et al. |
| 6,916,883 B2 | 7/2005 | Parikh et al. |
| 6,921,795 B2 | 7/2005 | Wang et al. |
| 6,921,799 B1 | 7/2005 | Follestad et al. |
| 6,924,342 B2 | 8/2005 | Stevens et al. |
| 6,969,741 B2 | 11/2005 | Lustiger et al. |
| 6,988,022 B2 | 1/2006 | Parrish et al. |
| 7,022,770 B2 | 4/2006 | Lustiger et al. |
| 7,101,939 B2 | 9/2006 | Nowlin et al. |
| 7,125,933 B2 | 10/2006 | German et al. |
| 7,148,304 B2 | 12/2006 | Kimberley et al. |
| 7,153,909 B2 | 12/2006 | Van Dun et al. |
| 7,166,676 B2 | 1/2007 | Jacobsen et al. |
| 7,230,054 B2 | 6/2007 | Mavridis et al. |
| 7,250,473 B2 | 7/2007 | Schramm et al. |
| 7,250,474 B2 | 7/2007 | Maziers |
| 7,271,221 B2 | 9/2007 | Stevens et al. |
| 7,300,983 B2 | 11/2007 | Degroot et al. |
| 7,432,328 B2 | 10/2008 | Jaker |
| 7,439,306 B2 | 10/2008 | Davis |
| 7,514,504 B2 | 4/2009 | Van Sinoy et al. |
| 7,645,835 B2 | 1/2010 | Van Dun et al. |
| 7,659,343 B2 | 2/2010 | Wooster et al. |
| 7,714,073 B2 | 5/2010 | Jacobsen et al. |
| 7,846,552 B2 | 12/2010 | Weeks |
| 7,858,702 B2 | 12/2010 | Jaker |
| 7,868,092 B2 | 1/2011 | Kwalk et al. |
| 7,906,451 B2 | 3/2011 | Citron et al. |
| 7,977,268 B2 | 7/2011 | Citron et al. |
| 7,999,039 B2 | 8/2011 | DeGroot et al. |
| 8,039,554 B2 | 10/2011 | Iseki et al. |
| 8,076,428 B2 | 12/2011 | Shim et al. |
| 8,101,685 B2 | 1/2012 | Jiang et al. |
| 8,101,687 B2 | 1/2012 | Schramm et al. |
| 8,410,217 B2 | 4/2013 | Tse et al. |
| 8,426,525 B2 | 4/2013 | Nozue et al. |
| 8,475,898 B2 | 7/2013 | Wang et al. |
| 2002/0177677 A1 | 11/2002 | Kanamori et al. |
| 2003/0114595 A1 | 6/2003 | Van Dun et al. |
| 2003/0149181 A1 | 8/2003 | Kolthammer et al. |
| 2005/0119413 A1 | 6/2005 | Maziers |
| 2006/0036041 A1 | 2/2006 | Kwalk |
| 2007/0010626 A1 | 1/2007 | Shankernarayanan et al. |
| 2009/0062463 A1 | 3/2009 | Backmann et al. |
| 2009/0099315 A1 | 4/2009 | Kipke et al. |
| 2010/0304052 A1 | 12/2010 | Chai et al. |
| 2012/0065335 A1 | 3/2012 | Kipke et al. |
| 2012/0252989 A1 | 10/2012 | Dewachter et al. |
| 2012/0309910 A1 | 12/2012 | Dewachter et al. |
| 2013/0085231 A1 | 4/2013 | Lue et al. |
| 2016/0108185 A1* | 4/2016 | Wang et al. ............... C08J 5/00 525/240 |
| 2016/0108196 A1* | 4/2016 | Ward et al. ............... C08J 5/00 428/137 |
| 2016/0108218 A1* | 4/2016 | Li et al. ............... C08J 5/00 525/240 |
| 2016/0108223 A1* | 4/2016 | Lam et al. ............... C08J 5/00 428/36.92 |

FOREIGN PATENT DOCUMENTS

| | | |
|---|---|---|
| EP | 0 989 140 A1 | 3/2000 |
| EP | 0 905 153 B1 | 3/2004 |
| EP | 1 961 777 A1 | 8/2008 |
| WO | 94/26816 A1 | 11/1994 |
| WO | 96/21276 A1 | 5/1998 |
| WO | 98/26000 A1 | 6/1998 |
| WO | 99/33913 A1 | 7/1999 |
| WO | 00/14129 A1 | 3/2000 |
| WO | 01/05852 A1 | 1/2001 |
| WO | 2006/045550 A1 | 5/2006 |
| WO | 2007/045415 A1 | 4/2007 |
| WO | 2009/040139 A1 | 4/2009 |
| WO | 2011/092266 A1 | 8/2011 |
| WO | 2012/004422 A1 | 1/2012 |
| WO | 2012/112259 A2 | 8/2012 |
| WO | 2012/119954 A1 | 9/2012 |
| WO | 2012/119956 A1 | 9/2012 |
| WO | 2012/133717 A1 | 10/2012 |
| WO | 2013/009514 A1 | 1/2013 |

\* cited by examiner

CAPS AND CLOSURES

FIELD

This disclosure relates to caps and closures comprising at least one ethylene interpolymer product manufactured in a continuous solution polymerization process utilizing at least two reactors employing at least one single-site catalyst formulation and at least one heterogeneous catalyst formulation to produce manufactured caps and closures having improved properties.

BACKGROUND

Ethylene interpolymer products are used in caps and closure applications to produce a wide variety of manufactured articles, e.g. caps for carbonated or non-carbonated fluids, as well as dispensing closures including closures with a living-hinge functionality. Such caps and closures are typically produced using conventional injection or compression molding processes. The ethylene interpolymers disclosed herein, having melt index ≥0.4 dg/min to ≤5.0 dg/min, have a G'[@G"=500 Pa] that is advantageous in compression molding processes, i.e. a G'[@G"=500 Pa] from ≥40 Pa to ≤70 Pa. Further, ethylene interpolymers disclosed herein, having melt index >5.0 dg/min to ≤20 dg/min have a G'[@G"=500 Pa] that is advantageous in injection molding processes, i.e. a G'[@G"=500 Pa] from ≥1 Pa to ≤35 Pa.

In caps and closure markets there are constant needs to develop new ethylene interpolymers having improved properties. Non limiting examples of needs include: stiffer caps and closures (higher modulus) that allow the manufacture of thinner and lighter weight caps and closures, i.e. improved sustainability (source reduction); higher heat deflection temperatures (HDT) which expands the upper use temperature of caps and closures and is advantageous in hot fill applications; faster crystallization rates which allows caps and closures to be manufactured at higher production rates, e.g. more parts per hour, and; improved Environmental Stress Crack Resistance (ESCR), particularly for caps and closures used in chemically aggressive environments.

The ethylene interpolymer products disclosed are produced in a solution polymerization process, where catalyst components, solvent, monomers and hydrogen are fed under pressure to more than one reactor. For ethylene homo polymerization, or ethylene copolymerization, solution reactor temperatures can range from about 80° C. to about 300° C. while pressures generally range from about 3 MPag to about 45 MPag and the ethylene interpolymer produced remains dissolved in the solvent. The residence time of the solvent in the reactor is relatively short, for example, from about 1 second to about 20 minutes. The solution process can be operated under a wide range of process conditions that allow the production of a wide variety of ethylene interpolymers. Post reactor, the polymerization reaction is quenched to prevent further polymerization, by adding a catalyst deactivator, and passivated, by adding an acid scavenger. Once passivated, the polymer solution is forwarded to a polymer recovery operation where the ethylene interpolymer is separated from process solvent, unreacted residual ethylene and unreacted optional α-olefin(s). Further, the ethylene interpolymer products disclosed herein are synthesized using at least two reactors employing at least one single-site catalyst formulation and at least one heterogeneous catalyst formulation.

SUMMARY OF DISCLOSURE

This application claims priority to Canadian Patent Application No. CA 2,868,640, filed Oct. 21, 2014 and entitled "SOLUTION POLYMERIZATION PROCESS".

This disclosure relates to caps and closures comprising at least one ethylene interpolymer product manufactured in a continuous solution polymerization process utilizing at least two reactors employing at least one single-site catalyst formulation and at least one heterogeneous catalyst formulation to produce manufactured caps and closures having improved properties.

Embodiment of this disclosure include caps and closures having at least one layer containing an ethylene interpolymer product comprising: (i) a first ethylene interpolymer; (ii) a second ethylene interpolymer, and; (iii) optionally a third ethylene interpolymer; where the ethylene interpolymer product has a Dilution Index, $Y_d$, greater than 0.

Embodiment of this include caps and closures having at least one layer containing an ethylene interpolymer product comprising: (i) a first ethylene interpolymer; (ii) a second ethylene interpolymer, and; (iii) optionally a third ethylene interpolymer; where the ethylene interpolymer has ≥0.03 terminal vinyl unsaturations per 100 carbon atoms.

Embodiment of this disclosure include caps and closures having at least one layer containing an ethylene interpolymer product comprising: (i) a first ethylene interpolymer; (ii) a second ethylene interpolymer, and; (iii) optionally a third ethylene interpolymer; where the ethylene interpolymer product has ≥3 parts per million (ppm) of a total catalytic metal.

Further embodiment include caps and closures having at least one layer containing an ethylene interpolymer product comprising: (i) a first ethylene interpolymer; (i) a first ethylene interpolymer; (ii) a second ethylene interpolymer, and; (iii) optionally a third ethylene interpolymer; where the ethylene interpolymer product has a Dilution Index, $Y_d$, greater than 0 and ≥0.03 terminal vinyl unsaturations per 100 carbon atoms or ≥3 parts per million (ppm) of a total catalytic metal or a Dimensionless Modulus, $X_d$, >0.

Additional embodiment include caps and closures having at least one layer containing an ethylene interpolymer product comprising: (i) a first ethylene interpolymer; (ii) a second ethylene interpolymer, and; (iii) optionally a third ethylene interpolymer; where the ethylene interpolymer product has ≥0.03 terminal vinyl unsaturations per 100 carbon atoms and ≥3 parts per million (ppm) of a total catalytic metal or a Dimensionless Modulus, $X_d$, >0.

Embodiments include caps and closures having at least one layer containing an ethylene interpolymer product comprising: (i) a first ethylene interpolymer; (ii) a second ethylene interpolymer, and; (iii) optionally a third ethylene interpolymer; where the ethylene interpolymer product has ≥3 parts per million (ppm) of a total catalytic metal and a Dimensionless Modulus, $X_d$, >0.

Further embodiments include caps and closures having at least one layer containing an ethylene interpolymer product comprising: (i) a first ethylene interpolymer; (ii) a second ethylene interpolymer, and; (iii) optionally a third ethylene interpolymer; where the ethylene interpolymer product has a Dilution Index, $Y_d$, greater than 0 and ≥0.03 terminal vinyl unsaturations per 100 carbon atoms and ≥3 parts per million (ppm) of a total catalytic metal or a Dimensionless Modulus, $X_d$, >0.

Additional embodiments include caps and closures having at least one layer containing an ethylene interpolymer product comprising: (i) a first ethylene interpolymer; (ii) a second ethylene interpolymer, and; (iii) optionally a third ethylene interpolymer; where the ethylene interpolymer product has a Dimensionless Modulus, $X_d$, >0 and ≥3 parts per million (ppm) of a total catalytic metal and a Dilution Index, $Y_d$, greater than 0 or ≥0.03 terminal vinyl unsaturations per 100 carbon atoms Embodiments also include caps and closures having at least one layer containing an ethylene interpolymer product comprising: (i) a first ethylene interpolymer; (ii) a second ethylene interpolymer, and; (iii) optionally a third ethylene interpolymer; where the ethylene interpolymer product has a Dilution Index, $Y_d$, greater than 0, a Dimensionless Modulus, $X_d$, >0, ≥3 parts per million (ppm) of a total catalytic metal and ≥0.03 terminal vinyl unsaturations per 100 carbon atoms.

The ethylene interpolymer products disclosed here have a melt index from about 0.4 to about 20 dg/minute, a density from about 0.948 to about 0.968 g/cm³, a $M_w/M_n$ from about 2 to about 25 and a $CDBI_{50}$ from about 54% to about 98%; where melt index is measured according to ASTM D1238 (2.16 kg load and 190° C.) and density is measured according to ASTM D792.

Further, the disclosed ethylene interpolymer products contain: (i) from about 15 to about 60 weight percent of a first ethylene interpolymer having a melt index from about 0.01 to about 200 dg/minute and a density from about 0.855 g/cm³ to about 0.975 g/cm³; (ii) from about 30 to about 85 weight percent of a second ethylene interpolymer having a melt index from about 0.3 to about 1000 dg/minute and a density from about 0.89 g/cm³ to about 0.975 g/cm³, and; (iii) optionally from about 0 to about 30 weight percent of a third ethylene interpolymer having a melt index from about 0.5 to about 2000 dg/minute and a density from about 0.89 to about 0.975 g/cm³; where weight percent is the weight of the first, second or third ethylene polymer divided by the weight of ethylene interpolymer product.

Embodiments of this disclosure include caps and closures comprising one or more ethylene interpolymer product synthesized in a solution polymerization process; where the ethylene interpolymer product may contain from 0 to about 1.0 mole percent of one or more α-olefins.

Further, the first ethylene interpolymer is synthesized using a single-site catalyst formulation and the second ethylene interpolymer is synthesized using a first heterogeneous catalyst formulation. Embodiments of caps and closures may contain ethylene interpolymers products where a third ethylene interpolymer is synthesized using a first heterogeneous catalyst formulation or a second heterogeneous catalyst formulation.

The second ethylene interpolymer may be synthesized using a first in-line Ziegler Natta catalyst formulation or a first batch Ziegler-Natta catalyst formulation; optionally, the third ethylene interpolymer is synthesized using the first in-line Ziegler Natta catalyst formulation or the first batch Ziegler-Natta catalyst formulation. The optional third ethylene interpolymer may be synthesized using a second in-line Ziegler Natta catalyst formulation or a second batch Ziegler-Natta catalyst formulation.

Embodiments of this disclosure include caps and closures containing an ethylene interpolymer product, where the ethylene interpolymer product has ≤1 part per million (ppm) of a metal A; where metal A originates from the single-site catalyst formulation; non-limiting examples of metal A include titanium, zirconium or hafnium.

Further embodiments include caps and closures containing an ethylene interpolymer product having a metal B and optionally a metal C; where the total amount of metal B and metal C is from about 3 to about 11 parts per million (ppm); where metal B originates from a first heterogeneous catalyst formulation and metal C originates form an optional second heterogeneous catalyst formation. Metals B and C are independently selected from the following non-limiting examples: titanium, zirconium, hafnium, vanadium, niobium, tantalum, chromium, molybdenum, tungsten, manganese, technetium, rhenium, iron, ruthenium or osmium. Metals B and C may be the same metal.

Additional embodiments of caps and closures contain ethylene interpolymer products where the first ethylene interpolymer has a first $M_w/M_n$, the second ethylene interpolymer has a second $M_w/M_n$ and the optional third ethylene has a third $M_w/M_n$; where the first $M_w/M_n$ is lower than the second $M_w/M_n$ and the optional third $M_w/M_n$. Embodiments also include ethylene interpolymer products where the blending of the second ethylene interpolymer and the third ethylene interpolymer form an ethylene interpolymer blend having a fourth $M_w/M_n$; where the fourth $M_w/M_n$ is not broader than the second $M_w/M_n$. Additional ethylene interpolymer product embodiments are characterized as having both the second $M_w/M_n$ and the third $M_w/M_n$ less than about 4.0.

Further, embodiments of caps and closures include ethylene interpolymer products where the first ethylene interpolymer has a first $CDBI_{50}$ from about 70 to about 98%, the second ethylene interpolymer has a second $CDBI_{50}$ from about 45 to about 98% and the optional third ethylene interpolymer has a third $CDBI_{50}$ from about 35 to about 98%. Other embodiments include ethylene interpolymer products where the first $CDBI_{50}$ is higher than the second $CDBI_{50}$; optionally the first $CDBI_{50}$ is higher than the third $CDBI_{50}$.

Embodiments also include cap and closures having a melt index from ≥0.4 dg/min to ≤5.0 dg/min and a G'[@G"=500 Pa] from ≥40 Pa to ≤70 Pa. Additional embodiments include caps and closures having a melt index from >5.0 dg/min to ≤20 dg/min and a G'[@G"=500 Pa] from ≥1 Pa to ≤35 Pa.

BRIEF DESCRIPTION OF FIGURES

The following Figures are presented for the purpose of illustrating selected embodiments of this disclosure; it being understood, that the embodiments shown do not limit this disclosure.

FIG. 2 is a plot of Dilution Index ($Y_d$) ($Y_d$ has dimensions of degrees (°)) and Dimensionless Modulus ($X_d$) for:

Comparative S (open triangle, $Y_d=X_d=0$) is an ethylene interpolymer comprising an ethylene interpolymer synthesized using an in-line Ziegler-Natta catalyst in a solution process (rheological reference);

Examples 6, 101, 102, 103, 110, 115, 200, 201 (solid circle, $Y_d>0$ and $X_d<0$) are ethylene interpolymer products as described in this disclosure comprising a first ethylene interpolymer synthesized using a single-site catalyst formulation and a second ethylene interpolymer synthesized using an in-line Ziegler-Natta catalyst formulation in a solution process;

Examples 120, 130 and 131 (solid square, $Y_d>0$, $X_d>0$) are ethylene interpolymer products as described in this disclosure;

Comparatives D and E (open diamond, $Y_d<0$, $X_d>0$) are ethylene interpolymers comprising a first ethylene interpolymer synthesized using a single-site catalyst formation and a second ethylene interpolymer synthesized using a batch Ziegler-Natta catalyst formulation in a solution process, and;

Comparative A (open square, $Y_d>0$ and $X_d<0$) is an ethylene interpolymer comprising a first and second ethylene interpolymer synthesized using a single-site catalyst formation in a solution process.

Figure 3:
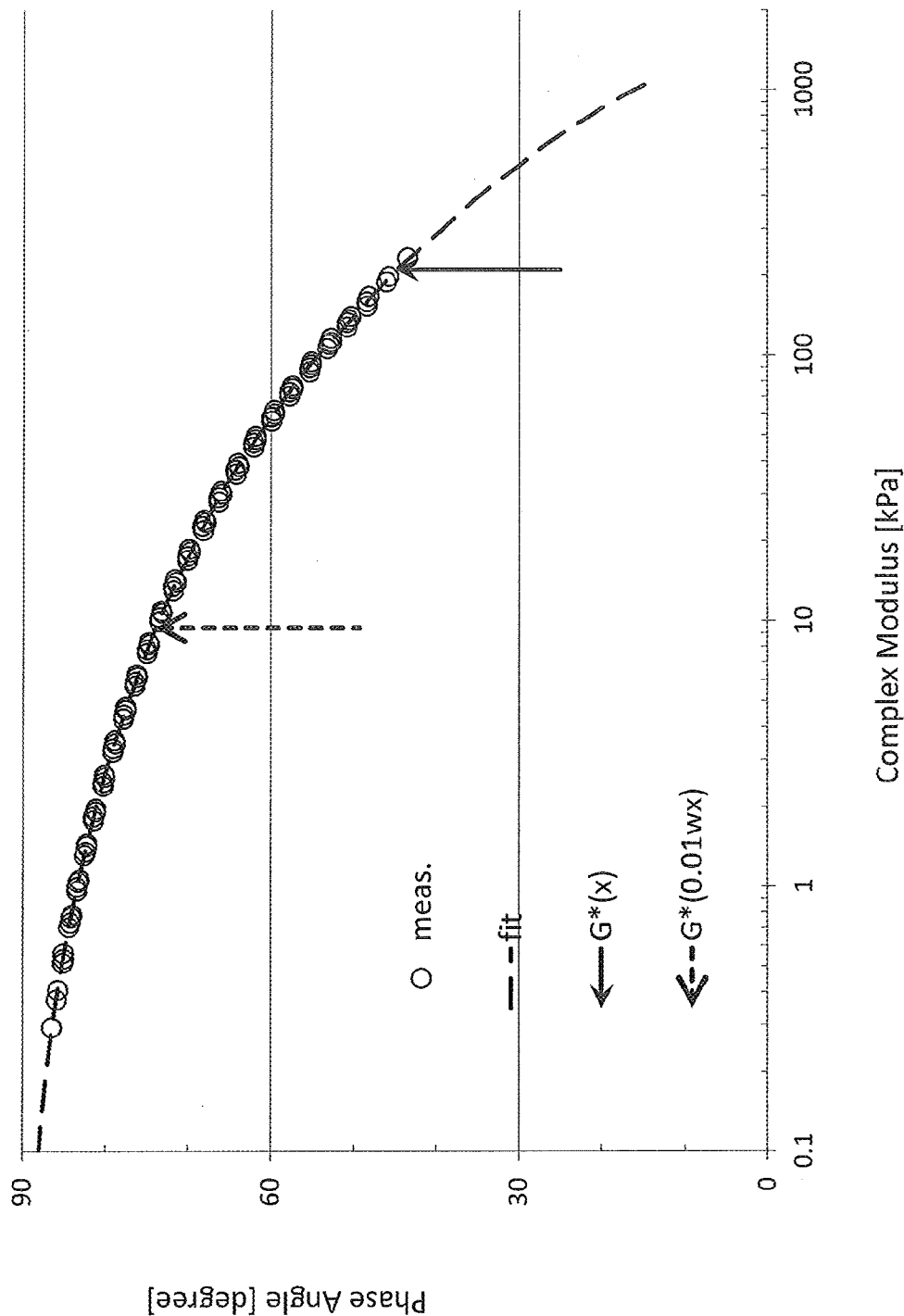

FIG. 3 illustrates a typical Van Gurp Palmen (VGP) plot of phase angle [°] versus complex modulus [kPa].

Figure 4:
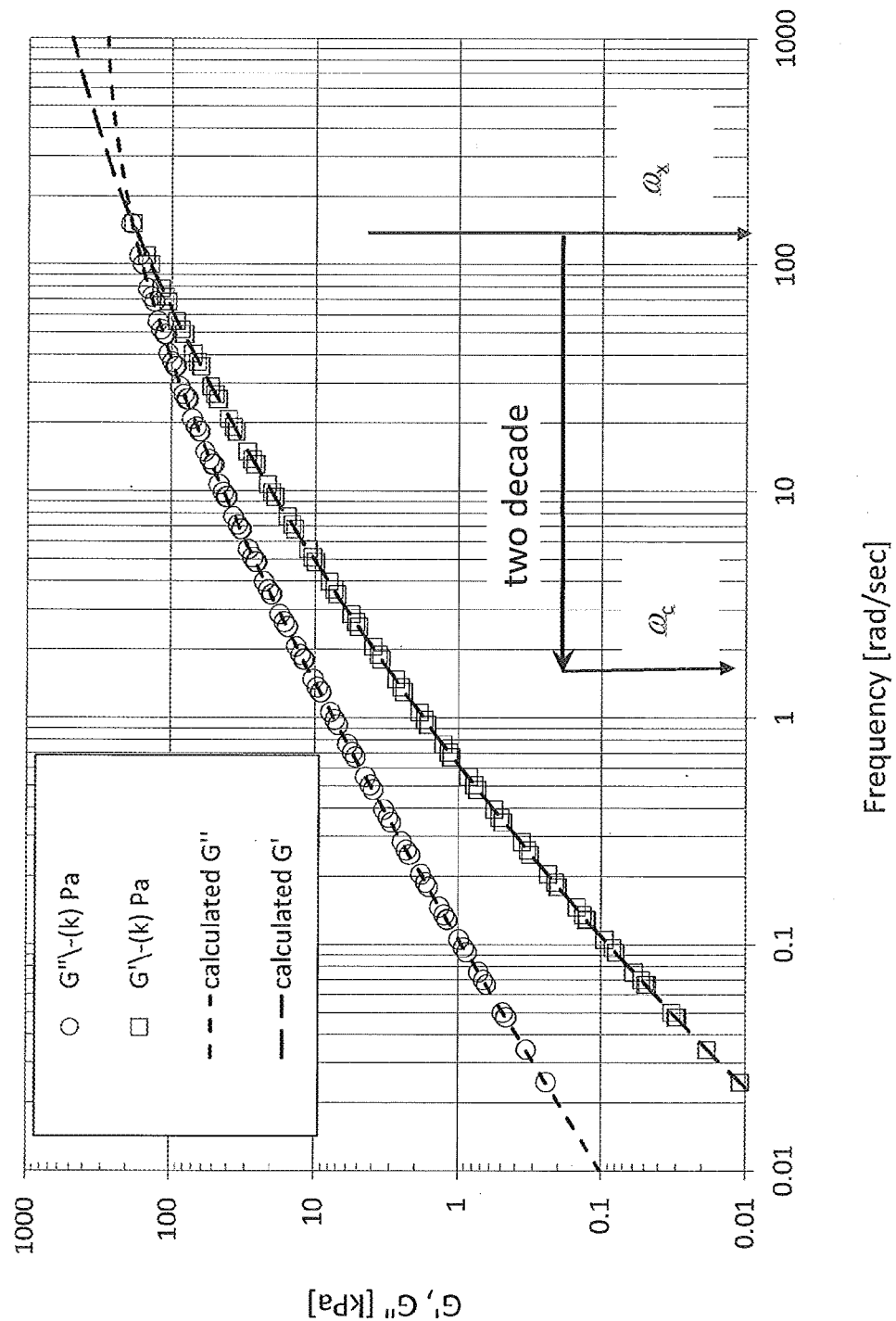

FIG. 4 plots the Storage modulus (G') and loss modulus (G") showing the cross over frequency $\omega_x$ and the two decade shift in phase angle to reach $\omega_c$ ($\omega_c=0.01\ \omega_x$).

Figure 5:
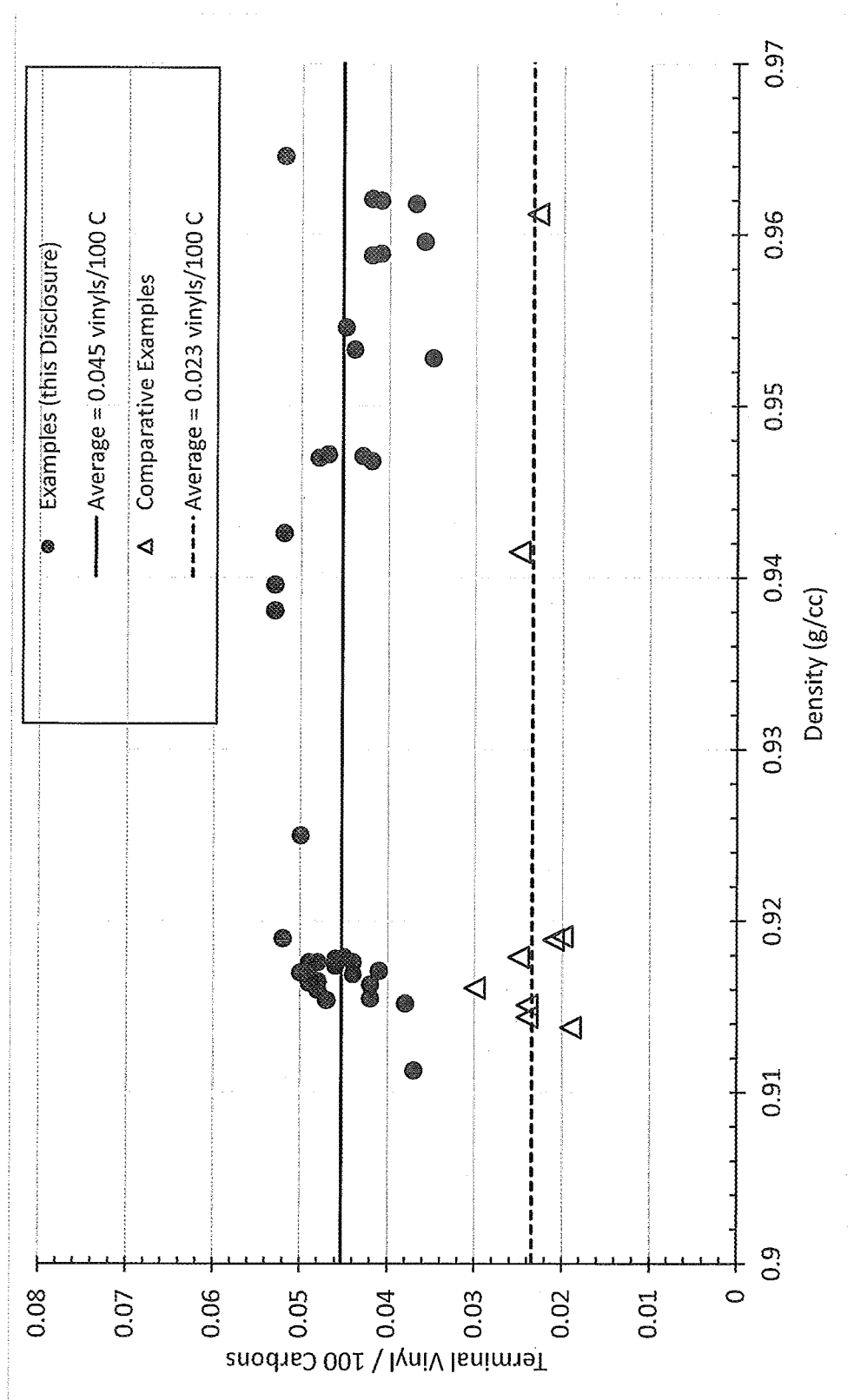

FIG. 5 compares the amount of terminal vinyl unsaturations per 100 carbon atoms (terminal vinyl/100 C) in the ethylene interpolymer products of this disclosure (solid circles) with Comparatives B, C, E, E2, G, H, H2, I and J (open triangles).

Figure 6:
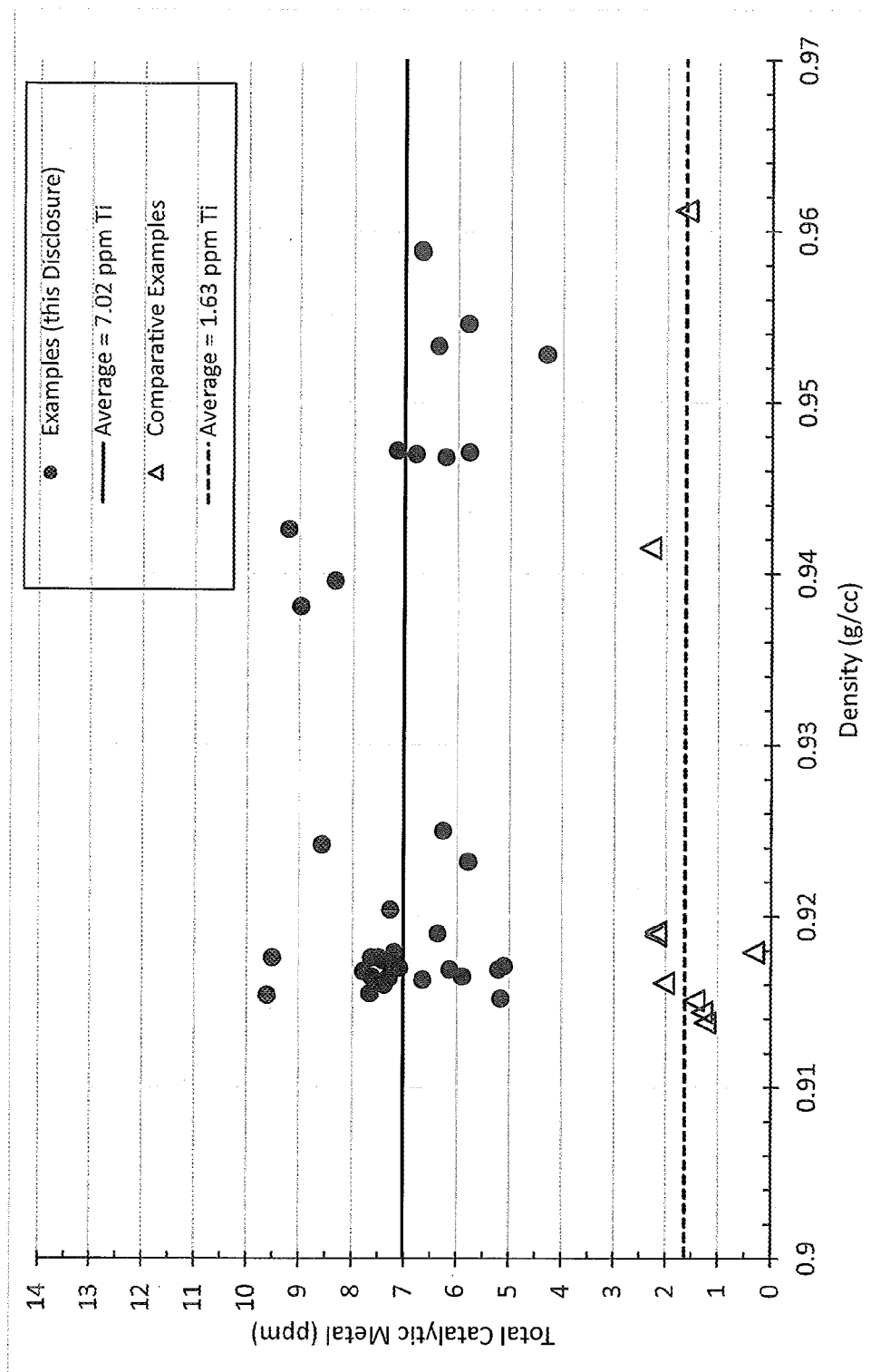

FIG. 6 compares the amount of total catalytic metal (ppm) in the ethylene interpolymer products of this disclosure (solid circles) with Comparatives B, C, E, E2, G, H, H2, I and J (open triangles).

DEFINITION OF TERMS

Other than in the examples or where otherwise indicated, all numbers or expressions referring to quantities of ingredients, extrusion conditions, etc., used in the specification and claims are to be understood as modified in all instances by the term "about." Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

The term "Dilution Index ($Y_d$)" and "Dimensionless Modulus ($X_d$)" are based on rheological measurements and are fully described in this disclosure.

The term "G'[@G"=500 Pa]" (Pa) is a rheological measurement, i.e. the value of the storage modulus G' (Pa) where the loss modulus G" is equal to 500 Pa.

As used herein, the term "monomer" refers to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain.

As used herein, the term "ethylene polymer", refers to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer also includes polymers produced in a high pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer also includes block copolymers which may include 2 to 4 comonomers. The term ethylene polymer also includes combinations of, or blends of, the ethylene polymers described above.

The term "ethylene interpolymer" refers to a subset of polymers within the "ethylene polymer" group that excludes polymers produced in high pressure polymerization processes; non-limiting examples of polymers produced in high pressure processes include LDPE and EVA (the latter is a copolymer of ethylene and vinyl acetate).

The term "heterogeneous ethylene interpolymers" refers to a subset of polymers in the ethylene interpolymer group that are produced using a heterogeneous catalyst formulation; non-limiting examples of which include Ziegler-Natta or chromium catalysts.

The term "homogeneous ethylene interpolymer" refers to a subset of polymers in the ethylene interpolymer group that are produced using metallocene or single-site catalysts. Typically, homogeneous ethylene interpolymers have narrow molecular weight distributions, for example gel permeation chromatography (GPC) $M_w/M_n$ values of less than 2.8;

$M_w$ and $M_n$ refer to weight and number average molecular weights, respectively. In contrast, the $M_w/M_n$ of heterogeneous ethylene interpolymers are typically greater than the $M_w/M_n$ of homogeneous ethylene interpolymers. In general, homogeneous ethylene interpolymers also have a narrow comonomer distribution, i.e. each macromolecule within the molecular weight distribution has a similar comonomer content. Frequently, the composition distribution breadth index "CDBI" is used to quantify how the comonomer is distributed within an ethylene interpolymer, as well as to differentiate ethylene interpolymers produced with different catalysts or processes. The "$CDBI_{50}$" is defined as the percent of ethylene interpolymer whose composition is within 50% of the median comonomer composition; this definition is consistent with that described in U.S. Pat. No. 5,206,075 assigned to Exxon Chemical Patents Inc. The $CDBI_{50}$ of an ethylene interpolymer can be calculated from TREF curves (Temperature Rising Elution Fractionation); the TREF method is described in Wild, et al., J. Polym. Sci., Part B, Polym. Phys., Vol. 20 (3), pages 441-455. Typically the $CDBI_{50}$ of homogeneous ethylene interpolymers are greater than about 70%. In contrast, the $CDBI_{50}$ of α-olefin containing heterogeneous ethylene interpolymers are generally lower than the $CDBI_{50}$ of homogeneous ethylene interpolymers.

It is well known to those skilled in the art, that homogeneous ethylene interpolymers are frequently further subdivided into "linear homogeneous ethylene interpolymers" and "substantially linear homogeneous ethylene interpolymers". These two subgroups differ in the amount of long chain branching: more specifically, linear homogeneous ethylene interpolymers have less than about 0.01 long chain branches per 1000 carbon atoms; while substantially linear ethylene interpolymers have greater than about 0.01 to about 3.0 long chain branches per 1000 carbon atoms. A long chain branch is macromolecular in nature, i.e. similar in length to the macromolecule that the long chain branch is attached to. Hereafter, in this disclosure, the term "homogeneous ethylene interpolymer" refers to both linear homogeneous ethylene interpolymers and substantially linear homogeneous ethylene interpolymers.

Herein, the term "polyolefin" includes ethylene polymers and propylene polymers; non-limiting examples of propylene polymers include isotactic, syndiotactic and atactic propylene homopolymers, random propylene copolymers containing at least one comonomer and impact polypropylene copolymers or heterophasic polypropylene copolymers.

The term "thermoplastic" refers to a polymer that becomes liquid when heated, will flow under pressure and solidify when cooled. Thermoplastic polymers include ethylene polymers as well as other polymers commonly used in the plastic industry; non-limiting examples of other polymers commonly used include barrier resins (EVOH), tie resins, polyethylene terephthalate (PET), polyamides and the like.

As used herein the term "monolayer" refers a cap or closure where the wall structure comprises a single layer.

As used herein, the terms "hydrocarbyl", "hydrocarbyl radical" or "hydrocarbyl group" refers to linear or cyclic, aliphatic, olefinic, acetylenic and aryl (aromatic) radicals comprising hydrogen and carbon that are deficient by one hydrogen.

As used herein, an "alkyl radical" includes linear, branched and cyclic paraffin radicals that are deficient by one hydrogen radical; non-limiting examples include methyl (—$CH_3$) and ethyl (—$CH_2CH_3$) radicals. The term "alkenyl radical" refers to linear, branched and cyclic hydrocarbons containing at least one carbon-carbon double bond that is deficient by one hydrogen radical.

Herein the term "R1" and its superscript form "$^{R1}$" refers to a first reactor in a continuous solution polymerization process; it being understood that R1 is distinctly different from the symbol $R^1$; the latter is used in chemical formula, e.g. representing a hydrocarbyl group. Similarly, the term "R2" and it's superscript form "$^{R2}$" refers to a second reactor, and; the term "R3" and it's superscript form "$^{R3}$" refers to a third reactor.

DETAILED DESCRIPTION

Catalysts

Organometallic catalyst formulations that are efficient in polymerizing olefins are well known in the art. In the embodiments disclosed herein, at least two catalyst formulations are employed in a continuous solution polymerization process. One of the catalyst formulations is a single-site catalyst formulation that produces a first ethylene interpolymer. The other catalyst formulation is a heterogeneous catalyst formulation that produces a second ethylene interpolymer. Optionally a third ethylene interpolymer is produced using the heterogeneous catalyst formulation that was used to produce the second ethylene interpolymer, or a different heterogeneous catalyst formulation may be used to produce the third ethylene interpolymer. In the continuous solution process, the at least one homogeneous ethylene interpolymer and the at least one heterogeneous ethylene interpolymer are solution blended and an ethylene interpolymer product is produced.

Single Site Catalyst Formulation

The catalyst components which make up the single site catalyst formulation are not particularly limited, i.e. a wide variety of catalyst components can be used. One non-limiting embodiment of a single site catalyst formulation comprises the following three or four components: a bulky ligand-metal complex; an alumoxane co-catalyst; an ionic activator and optionally a hindered phenol. In Table 2A of this disclosure: "(i)" refers to the amount of "component (i)", i.e. the bulky ligand-metal complex added to R1; "(ii)" refers to "component (ii)", i.e. the alumoxane co-catalyst; "(iii)" refers to "component (iii)" i.e. the ionic activator, and; "(iv)" refers to "component (iv)", i.e. the optional hindered phenol.

Non-limiting examples of component (i) are represented by formula (I):

$$(L^A)_a M(Pl)_b (Q)_n \qquad (I)$$

wherein ($L^A$) represents a bulky ligand; M represents a metal atom; Pl represents a phosphinimine ligand; Q represents a leaving group; a is 0 or 1; b is 1 or 2; (a+b)=2; n is 1 or 2, and; the sum of (a+b+n) equals the valance of the metal M.

Non-limiting examples of the bulky ligand $L^A$ in formula (I) include unsubstituted or substituted cyclopentadienyl ligands or cyclopentadienyl-type ligands, heteroatom substituted and/or heteroatom containing cyclopentadienyl-type ligands. Additional non-limiting examples include, cyclopentaphenanthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In other embodiments, $L^A$ may be any other ligand structure capable of η-bonding to the metal M, such embodiments include both $η^3$-bonding and $η^5$-bonding to the metal M. In other embodiments, $L^A$ may comprise one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. Other non-limiting embodiments for $L^A$ include bulky amides, phosphides, alkoxides, aryloxides, imides, carbolides, borollides, porphyrins, phthalocyanines, corrins and other polyazomacrocycles.

Non-limiting examples of metal M in formula (I) include Group 4 metals, titanium, zirconium and hafnium.

The phosphinimine ligand, Pl, is defined by formula (II):

$(R^P)_3P=N—$ (II)

wherein the $R^P$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula —$Si(R^s)_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula —$Ge(R^G)_3$, wherein the $R^G$ groups are defined as $R^s$ is defined in this paragraph.

The leaving group Q is any ligand that can be abstracted from formula (I) forming a catalyst species capable of polymerizing one or more olefin(s). An equivalent term for Q is an "activatable ligand", i.e. equivalent to the term "leaving group". In some embodiments, Q is a monoanionic labile ligand having a sigma bond to M. Depending on the oxidation state of the metal, the value for n is 1 or 2 such that formula (I) represents a neutral bulky ligand-metal complex. Non-limiting examples of Q ligands include a hydrogen atom, halogens, $C_{1-20}$ hydrocarbyl radicals, $C_{1-20}$ alkoxy radicals, $C_{5-10}$ aryl oxide radicals; these radicals may be linear, branched or cyclic or further substituted by halogen atoms, $C_{1-10}$ alkyl radicals, $C_{1-10}$ alkoxy radicals, $C_{6-10}$ arly or aryloxy radicals. Further non-limiting examples of Q ligands include weak bases such as amines, phosphines, ethers, carboxylates, dienes, hydrocarbyl radicals having from 1 to 20 carbon atoms. In another embodiment, two Q ligands may form part of a fused ring or ring system.

Further embodiments of component (i) of the single site catalyst formulation include structural, optical or enantiomeric isomers (meso and racemic isomers) and mixtures thereof of the bulky ligand-metal complexes described in formula (I) above.

The second single site catalyst component, component (ii), is an alumoxane co-catalyst that activates component (i) to a cationic complex. An equivalent term for "alumoxane" is "aluminoxane"; although the exact structure of this co-catalyst is uncertain, subject matter experts generally agree that it is an oligomeric species that contain repeating units of the general formula (III):

$(R)_2AlO—(Al(R)—O)_n—Al(R)_2$ (III)

where the R groups may be the same or different linear, branched or cyclic hydrocarbyl radicals containing 1 to 20 carbon atoms and n is from 0 to about 50. A non-limiting example of an alumoxane is methyl aluminoxane (or MAO) wherein each R group in formula (III) is a methyl radical.

The third catalyst component (iii) of the single site catalyst formation is an ionic activator. In general, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas (IV) and (V) shown below;

$[R^5]^+[B(R^7)_4]^-$ (IV)

where B represents a boron atom, $R^5$ is an aromatic hydrocarbyl (e.g. triphenyl methyl cation) and each $R^7$ is independently selected from phenyl radicals which are unsubstituted or substituted with from 3 to 5 substituents selected from fluorine atoms, $C_{1-4}$ alkyl or alkoxy radicals which are unsubstituted or substituted by fluorine atoms; and a silyl radical of formula —$Si(R^9)_3$, where each $R^9$ is independently selected from hydrogen atoms and $C_{1-4}$ alkyl radicals, and; compounds of formula (V);

$[(R^8)_tZH]^+[B(R^7)_4]^-$ (V)

where B is a boron atom, H is a hydrogen atom, Z is a nitrogen or phosphorus atom, t is 2 or 3 and $R^8$ is selected from $C_{1-8}$ alkyl radicals, phenyl radicals which are unsubstituted or substituted by up to three $C_{1-4}$ alkyl radicals, or one $R^8$ taken together with the nitrogen atom may form an anilinium radical and $R^7$ is as defined above in formula (IV).

In both formula (IV) and (V), a non-limiting example of $R^7$ is a pentafluorophenyl radical. In general, boron ionic activators may be described as salts of tetra(perfluorophenyl)boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium)tetrakis(3,4,5-trifluorophenyl)borate, tropillium tetrakis(3,4,5-trifluorophenyl)borate, benzene(diazonium)tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium)tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium)tetrakis(2,3,4,5-tetrafluorophenyl)borate. Readily available commercial ionic activators include N,N-dimethylanilinium tetrakispentafluorophenyl borate, and triphenylmethylium tetrakispentafluorophenyl borate.

The optional fourth catalyst component of the single site catalyst formation is a hindered phenol, component (iv). Non-limiting example of hindered phenols include butylated phenolic antioxidants, butylated hydroxytoluene, 2,4-di-tertiarybutyl-6-ethyl phenol, 4,4'-methylenebis(2,6-di-tertiary-butylphenol), 1,3,5-trimethyl-2,4,6-tris(3,5-di-tert-butyl-4-hydroxybenzyl)benzene and octadecyl-3-(3',5'-di-tert-butyl-4'-hydroxyphenyl) propionate.

To produce an active single site catalyst formulation the quantity and mole ratios of the three or four components, (i) through (iv) are optimized as described below.

Heterogeneous Catalyst Formulations

A number of heterogeneous catalyst formulations are well known to those skilled in the art, including, as non-limiting examples, Ziegler-Natta and chromium catalyst formulations.

In this disclosure, embodiments include an in-line and batch Ziegler-Natta catalyst formulations. The term "in-line Ziegler-Natta catalyst formulation" refers to the continuous synthesis of a small quantity of active Ziegler-Natta catalyst and immediately injecting this catalyst into at least one continuously operating reactor, where the catalyst polymerizes ethylene and one or more optional α-olefins to form an ethylene interpolymer. The terms "batch Ziegler-Natta catalyst formulation" or "batch Ziegler-Natta procatalyst" refer to the synthesis of a much larger quantity of catalyst or procatalyst in one or more mixing vessels that are external to, or isolated from, the continuously operating solution polymerization process. Once prepared, the batch Ziegler-Natta catalyst formulation, or batch Ziegler-Natta procatalyst, is transferred to a catalyst storage tank. The term "procatalyst" refers to an inactive catalyst formulation (inactive with respect to ethylene polymerization); the procatalyst is converted into an active catalyst by adding an alkyl aluminum co-catalyst. As needed, the procatalyst is pumped from the storage tank to at least one continuously operating reactor, where an active catalyst is formed and polymerizes ethylene and one or more optional α-olefins to form an ethylene interpolymer. The procatalyst may be converted into an active catalyst in the reactor or external to the reactor.

A wide variety of chemical compounds can be used to synthesize an active Ziegler-Natta catalyst formulation. The following describes various chemical compounds that may be combined to produce an active Ziegler-Natta catalyst formulation. Those skilled in the art will understand that the embodiments in this disclosure are not limited to the specific chemical compound disclosed.

An active Ziegler-Natta catalyst formulation may be formed from: a magnesium compound, a chloride compound, a metal compound, an alkyl aluminum co-catalyst and an aluminum alkyl. In Table 2A of this disclosure: "(v)" refers to "component (v)" the magnesium compound; the term "(vi)" refers to the "component (vi)" the chloride compound; "(vii)" refers to "component (vii)" the metal compound; "(viii)" refers to "component (viii)" alkyl aluminum co-catalyst, and; "(ix)" refers to "component (ix)" the aluminum alkyl. As will be appreciated by those skilled in the art, Ziegler-Natta catalyst formulations may contain additional components; a non-limiting example of an additional component is an electron donor, e.g. amines or ethers.

A non-limiting example of an active in-line Ziegler-Natta catalyst formulation can be prepared as follows. In the first step, a solution of a magnesium compound (component (v)) is reacted with a solution of the chloride compound (component (vi)) to form a magnesium chloride support suspended in solution. Non-limiting examples of magnesium compounds include $Mg(R^1)_2$; wherein the $R^1$ groups may be the same or different, linear, branched or cyclic hydrocarbyl radicals containing 1 to 10 carbon atoms. Non-limiting examples of chloride compounds include $R^2Cl$; wherein $R^2$ represents a hydrogen atom, or a linear, branched or cyclic hydrocarbyl radical containing 1 to 10 carbon atoms. In the first step, the solution of magnesium compound may also contain an aluminum alkyl (component (ix)). Non-limiting examples of aluminum alkyl include $Al(R^3)_3$, wherein the $R^3$ groups may be the same or different, linear, branched or cyclic hydrocarbyl radicals containing from 1 to 10 carbon atoms. In the second step a solution of the metal compound (component (vii)) is added to the solution of magnesium chloride and the metal compound is supported on the magnesium chloride. Non-limiting examples of suitable metal compounds include $M(X)_n$ or $MO(X)_n$; where M represents a metal selected from Group 4 through Group 8 of the Periodic Table, or mixtures of metals selected from Group 4 through Group 8; O represents oxygen, and; X represents chloride or bromide; n is an integer from 3 to 6 that satisfies the oxidation state of the metal. Additional non-limiting examples of suitable metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands. In the third step a solution of an alkyl aluminum co-catalyst (component (viii)) is added to the metal compound supported on the magnesium chloride. A wide variety of alkyl aluminum co-catalysts are suitable, as expressed by formula (VI):

$$Al(R^4)_p(OR^5)_q(X)_r \qquad (VI)$$

wherein the $R^4$ groups may be the same or different, hydrocarbyl groups having from 1 to 10 carbon atoms; the $OR^5$ groups may be the same or different, alkoxy or aryloxy groups wherein $R^5$ is a hydrocarbyl group having from 1 to 10 carbon atoms bonded to oxygen; X is chloride or bromide, and; (p+q+r)=3, with the proviso that p is greater than 0. Non-limiting examples of commonly used alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

The process described in the paragraph above, to synthesize an active in-line Ziegler-Natta catalyst formulation, can be carried out in a variety of solvents; non-limiting examples of solvents include linear or branched $C_5$ to $C_{12}$ alkanes or mixtures thereof. To produce an active in-line Ziegler-Natta catalyst formulation the quantity and mole ratios of the five components, (v) through (ix), are optimized as described below.

Additional embodiments of heterogeneous catalyst formulations include formulations where the "metal compound" is a chromium compound; non-limiting examples include silyl chromate, chromium oxide and chromocene. In some embodiments, the chromium compound is supported on a metal oxide such as silica or alumina. Heterogeneous catalyst formulations containing chromium may also include co-catalysts; non-limiting examples of co-catalysts include trialkylaluminum, alkylaluminoxane and dialkoxyalkylaluminum compounds and the like.

Solution Polymerization Process: In-Line Heterogeneous Catalyst Formulation

The ethylene interpolymer products disclosed herein, useful in the manufacture of flexible and rigid articles, were produced in a continuous solution polymerization process.

This solution process has been fully described in Canadian Patent Application No. CA 2,868,640, filed Oct. 21, 2014 and entitled "SOLUTION POLYMERIZATION PROCESS"; which is incorporated by reference into this application in its entirety.

Embodiments of this process includes at least two continuously stirred reactors, R1 and R2 and an optional tubular reactor R3. Feeds (solvent, ethylene, at least two catalyst formulations, optional hydrogen and optional α-olefin) are feed to at least two reactor continuously. A single site catalyst formulation is injected into R1 and a first heterogeneous catalyst formation is injected into R2 and optionally R3. Optionally, a second heterogeneous catalyst formulation is injected into R3. The single site catalyst formulation includes an ionic activator (component (iii)), a bulky ligand-metal complex (component (i)), an alumoxane co-catalyst (component (ii)) and an optional hindered phenol (component (iv)), respectively.

R1 and R2 may be operated in series or parallel modes of operation. To be more clear, in series mode 100% of the effluent from R1 flows directly into R2. In parallel mode, R1 and R2 operate independently and the effluents from R1 and R2 are combined downstream of the reactors.

A heterogeneous catalyst formulation is injected into R2. In one embodiment a first in-line Ziegler-Natta catalyst formulation is injected into R2. A first in-line Ziegler-Natta catalyst formation is formed within a first heterogeneous catalyst assembly by optimizing the following molar ratios: (aluminum alkyl)/(magnesium compound) or (ix)/(v); (chloride compound)/(magnesium compound) or (vi)/(v); (alkyl aluminum co-catalyst)/(metal compound) or (viii)/(vii), and; (aluminum alkyl)/(metal compound) or (ix)/(vii); as well as the time these compounds have to react and equilibrate. Within the first heterogeneous catalyst assembly the time between the addition of the chloride compound and the addition of the metal compound (component (vii)) is controlled; hereafter HUT-1 (the first Hold-Up-Time). The time between the addition of component (vii) and the addition of the alkyl aluminum co-catalyst, component (viii), is also controlled; hereafter HUT-2 (the second Hold-Up-Time). In addition, the time between the addition of the alkyl aluminum co-catalyst and the injection of the in-line Ziegler-Natta catalyst formulation into R2 is controlled; hereafter HUT-3 (the third Hold-Up-Time). Optionally, 100% of the alkyl aluminum co-catalyst, may be injected directly into R2. Optionally, a portion of the alkyl aluminum co-catalyst may be injected into the first heterogeneous catalyst assembly and the remaining portion injected directly into R2. The quantity of in-line heterogeneous catalyst formulation added to R2 is expressed as the parts-per-million (ppm) of metal compound (component (vii)) in the reactor solution, hereafter "R2 (vii) (ppm)". Injection of the in-line heterogeneous catalyst formulation into R2 produces a second ethylene interpolymer in a second exit stream (exiting R2). Optionally the second exit stream is deactivated by adding a catalyst deactivator. If the second exit stream is not deactivated the second exit stream enters reactor R3. One embodiment of a suitable R3 design is a tubular reactor. Optionally, one or more of the following fresh feeds may be injected into R3; solvent, ethylene, hydrogen, α-olefin and a first or second heterogeneous catalyst formulation; the latter is supplied from a second heterogeneous catalyst assembly. The chemical composition of the first and second heterogeneous catalyst formulations may be the same, or different, i.e. the catalyst components ((v) through (ix)), mole ratios and hold-up-times may differ in the first and second heterogeneous catalyst assemblies. The second heterogeneous catalyst assembly generates an efficient catalyst by optimizing hold-up-times and the molar ratios of the catalyst components.

In reactor R3, a third ethylene interpolymer may, or may not, form. A third ethylene interpolymer will not form if a catalyst deactivator is added upstream of reactor R3. A third ethylene interpolymer will be formed if a catalyst deactivator is added downstream of R3. The optional third ethylene interpolymer may be formed using a variety of operational modes (with the proviso that catalyst deactivator is not added upstream). Non-limiting examples of operational modes include: (a) residual ethylene, residual optional α-olefin and residual active catalyst entering R3 react to form the third ethylene interpolymer, or; (b) fresh process solvent, fresh ethylene and optionally fresh α-olefin are added to R3 and the residual active catalyst entering R3 forms the third ethylene interpolymer, or; (c) a second in-line heterogeneous catalyst formulation is added to R3 to polymerize residual ethylene and residual optional α-olefin to form the third ethylene interpolymer, or; (d) fresh process solvent, ethylene, optional α-olefin and a second in-line heterogeneous catalyst formulation are added to R3 to form the third ethylene interpolymer.

In series mode, R3 produces a third exit stream (the stream exiting R3) containing the first ethylene interpolymer, the second ethylene interpolymer and optionally a third ethylene interpolymer. A catalyst deactivator may be added to the third exit stream producing a deactivated solution; with the proviso a catalyst deactivator is not added if a catalyst deactivator was added upstream of R3.

The deactivated solution passes through a pressure let down device, a heat exchanger and a passivator is added forming a passivated solution. The passivated solution passes through a series of vapor liquid separators and ultimately the ethylene interpolymer product enters polymer recover. Non-limiting examples of polymer recovery operations include one or more gear pump, single screw extruder or twin screw extruder that forces the molten ethylene interpolymer product through a pelletizer.

Embodiments of the manufactured articles disclosed herein, may also be formed from ethylene interpolymer products synthesized using a batch Ziegler-Natta catalyst. Typically, a first batch Ziegler-Natta procatalyst is injected into R2 and the procatalyst is activated within R2 by injecting an alkyl aluminum co-catalyst forming a first batch Ziegler-Natta catalyst. Optionally, a second batch Ziegler-Natta procatalyst is injected into R3.

Additional Solution Polymerization Process Parameters

A variety of solvents may be used as the process solvent; non-limiting examples include linear, branched or cyclic $C_5$ to $C_{12}$ alkanes. Non-limiting examples of α-olefins include $C_3$ to $C_{10}$ α-olefins. It is well known to individuals of ordinary experience in the art that reactor feed streams (solvent, monomer, α-olefin, hydrogen, catalyst formulation etc.) must be essentially free of catalyst deactivating poisons; non-limiting examples of poisons include trace amounts of oxygenates such as water, fatty acids, alcohols, ketones and aldehydes. Such poisons are removed from reactor feed streams using standard purification practices; non-limiting examples include molecular sieve beds, alumina beds and oxygen removal catalysts for the purification of solvents, ethylene and α-olefins, etc.

In operating the continuous solution polymerization process total amount of ethylene supplied to the process can be portioned or split between the three reactors R1, R2 and R3. This operational variable is referred to as the Ethylene Split (ES), i.e. "$ES^{R1}$", "$ES^{R2}$" and "$ES^{R3}$" refer to the weight percent of ethylene injected in R1, R2 and R3, respectively;

with the proviso that $ES^{R1}+ES^{R2}+ES^{R3}=100\%$. The ethylene concentration in each reactor is also controlled. The R1 ethylene concentration is defined as the weight of ethylene in reactor 1 divided by the total weight of everything added to reactor 1; the R2 ethylene concentration (wt %) and R3 ethylene concentration (wt %) are defined similarly. The total amount of ethylene converted in each reactor is monitored. The term "$Q^{R1}$" refers to the percent of the ethylene added to R1 that is converted into an ethylene interpolymer by the catalyst formulation. Similarly $Q^{R2}$ and $Q^{R3}$ represent the percent of the ethylene added to R2 and R3 that was converted into ethylene interpolymer, in the respective reactor. The term "$Q^T$" represents the total or overall ethylene conversion across the entire continuous solution polymerization plant; i.e. $Q^T=100\times$[weight of ethylene in the interpolymer product]/([weight of ethylene in the interpolymer product]+[weight of unreacted ethylene]). Optionally, α-olefin may be added to the continuous solution polymerization process. If added, α-olefin may be proportioned or split between R1, R2 and R3. This operational variable is referred to as the Comonomer Split (CS), i.e. "$CS^{R1}$", "$CS^{R2}$" and "$CS^{R3}$" refer to the weight percent of α-olefin comonomer that is injected in R1, R2 and R3, respectively; with the proviso that $CS^{R1}+CS^{R2}+CS^{R3}=100\%$.

In the continuous polymerization processes described, polymerization is terminated by adding a catalyst deactivator. The catalyst deactivator substantially stops the polymerization reaction by changing active catalyst species to inactive forms. Suitable deactivators are well known in the art, non-limiting examples include: amines (e.g. U.S. Pat. No. 4,803,259 to Zboril et al.); alkali or alkaline earth metal salts of carboxylic acid (e.g. U.S. Pat. No. 4,105,609 to Machan et al.); water (e.g. U.S. Pat. No. 4,731,438 to Bernier et al.); hydrotalcites, alcohols and carboxylic acids (e.g. U.S. Pat. No. 4,379,882 to Miyata); or a combination thereof (U.S. Pat. No. 6,180,730 to Sibtain et al.).

Prior to entering the vapor/liquid separator, a passivator or acid scavenger is added to deactivated solution. Suitable passivators are well known in the art, non-limiting examples include alkali or alkaline earth metal salts of carboxylic acids or hydrotalcites.

In this disclosure, the number of solution reactors is not particularly important; with the proviso that the continuous solution polymerization process comprises at least two reactors that employ at least one single-site catalyst formulation and at least one heterogeneous catalyst formulation.

First Ethylene Interpolymer

The first ethylene interpolymer is produced with a single-site catalyst formulation. If the optional α-olefin is not added to reactor 1 (R1), then the ethylene interpolymer produced in R1 is an ethylene homopolymer. If an α-olefin is added, the following weight ratio is one parameter to control the density of the first ethylene interpolymer: $((\alpha\text{-olefin})/(\text{ethylene}))^{R1}$. The symbol "$\sigma^1$" refers to the density of the first ethylene interpolymer produced in R1. The upper limit on $\sigma^1$ may be about 0.975 g/cm³; in some cases about 0.965 g/cm³ and; in other cases about 0.955 g/cm³. The lower limit on $\sigma^1$ may be about 0.855 g/cm³, in some cases about 0.865 g/cm³, and; in other cases about 0.875 g/cm³.

Methods to determine the $CDBI_{50}$ (Composition Distribution Branching Index) of an ethylene interpolymer are well known to those skilled in the art. The $CDBI_{50}$, expressed as a percent, is defined as the percent of the ethylene interpolymer whose comonomer composition is within 50% of the median comonomer composition. It is also well known to those skilled in the art that the $CDBI_{50}$ of ethylene interpolymers produced with single-site catalyst formulations are higher relative to the $CDBI_{50}$ of α-olefin containing ethylene interpolymers produced with heterogeneous catalyst formulations. The upper limit on the $CDBI_{50}$ of the first ethylene interpolymer (produced with a single-site catalyst formulation) may be about 98%, in other cases about 95% and in still other cases about 90%. The lower limit on the $CDBI_{50}$ of the first ethylene interpolymer may be about 70%, in other cases about 75% and in still other cases about 80%.

As is well known to those skilled in the art the $M_w/M_n$ of ethylene interpolymers produced with single site catalyst formulations are lower relative to ethylene interpolymers produced with heterogeneous catalyst formulations. Thus, in the embodiments disclosed, the first ethylene interpolymer has a lower $M_w/M_n$ relative to the second ethylene interpolymer; where the second ethylene interpolymer is produced with a heterogeneous catalyst formulation. The upper limit on the $M_w/M_n$ of the first ethylene interpolymer may be about 2.8, in other cases about 2.5 and in still other cases about 2.2. The lower limit on the $M_w/M_n$ the first ethylene interpolymer may be about 1.7, in other cases about 1.8 and in still other cases about 1.9.

The first ethylene interpolymer contains catalyst residues that reflect the chemical composition of the single-site catalyst formulation used. Those skilled in the art will understand that catalyst residues are typically quantified by the parts per million of metal in the first ethylene interpolymer, where metal refers to the metal in component (i), i.e. the metal in the "bulky ligand-metal complex"; hereafter (and in the claims) this metal will be referred to "metal A". As recited earlier in this disclosure, non-limiting examples of metal A include Group 4 metals, titanium, zirconium and hafnium. The upper limit on the ppm of metal A in the first ethylene interpolymer may be about 1.0 ppm, in other cases about 0.9 ppm and in still other cases about 0.8 ppm. The lower limit on the ppm of metal A in the first ethylene interpolymer may be about 0.01 ppm, in other cases about 0.1 ppm and in still other cases about 0.2 ppm.

The amount of hydrogen added to R1 can vary over a wide range allowing the continuous solution process to produce first ethylene interpolymers that differ greatly in melt index, hereafter $I_2^1$ (melt index is measured at 190° C. using a 2.16 kg load following the procedures outlined in ASTM D1238). The quantity of hydrogen added to R1 is expressed as the parts-per-million (ppm) of hydrogen in R1 relative to the total mass in reactor R1; hereafter $H_2^{R1}$ (ppm). The upper limit on $I_2^1$ may be about 200 dg/min, in some cases about 100 dg/min; in other cases about 50 dg/min, and; in still other cases about 1 dg/min. The lower limit on $I_2^1$ may be about 0.01 dg/min, in some cases about 0.05 dg/min; in other cases about 0.1 dg/min, and; in still other cases about 0.5 dg/min.

The upper limit on the weight percent (wt %) of the first ethylene interpolymer in the ethylene interpolymer product may be about 60 wt %, in other cases about 55 wt % and in still other cases about 50 wt %. The lower limit on the wt % of the first ethylene interpolymer in the ethylene interpolymer product may be about 15 wt %; in other cases about 25 wt % and in still other cases about 30 wt %.

Second Ethylene Interpolymer

If optional α-olefin is not added to reactor 2 (R2) either by adding fresh α-olefin to R2 (or carried over from R1) then the ethylene interpolymer produced in R2 is an ethylene homopolymer. If an optional α-olefin is present in R2, the following weight ratio is one parameter to control the density of the second ethylene interpolymer produced in R2: $((\alpha\text{-olefin})/(\text{ethylene}))^{R2}$. Hereafter, the symbol "$\sigma^2$" refers to the density of the ethylene interpolymer produced in R2. The upper limit on $\sigma^2$ may be about 0.975 g/cm$^3$; in some cases about 0.965 g/cm$^3$ and; in other cases about 0.955 g/cm$^3$. Depending on the heterogeneous catalyst formulation used, the lower limit on $\sigma^2$ may be about 0.89 g/cm$^3$, in some cases about 0.90 g/cm$^3$, and; in other cases about 0.91 g/cm$^3$.

A heterogeneous catalyst formulation is used to produce the second ethylene interpolymer. If the second ethylene interpolymer contains an α-olefin, the CDBI$_{50}$ of the second ethylene interpolymer is lower relative to the CDBI$_{50}$ of the first ethylene interpolymer that was produced with a single-site catalyst formulation. In an embodiment of this disclosure, the upper limit on the CDBI$_{50}$ of the second ethylene interpolymer (that contains an α-olefin) may be about 70%, in other cases about 65% and in still other cases about 60%. In an embodiment of this disclosure, the lower limit on the CDBI$_{50}$ of the second ethylene interpolymer (that contains an α-olefin) may be about 45%, in other cases about 50% and in still other cases about 55%. If an α-olefin is not added to the continuous solution polymerization process the second ethylene interpolymer is an ethylene homopolymer. In the case of a homopolymer, which does not contain α-olefin, one can still measure a CDBI$_{50}$ using TREF. In the case of a homopolymer, the upper limit on the CDBI$_{50}$ of the second ethylene interpolymer may be about 98%, in other cases about 96% and in still other cases about 95%, and; the lower limit on the CDBI$_{50}$ may be about 88%, in other cases about 89% and in still other cases about 90%. It is well known to those skilled in the art that as the α-olefin content in the second ethylene interpolymer approaches zero, there is a smooth transition between the recited CDBI$_{50}$ limits for the second ethylene interpolymers (that contain an α-olefin) and the recited CDBI$_{50}$ limits for the second ethylene interpolymers that are ethylene homopolymers. Typically, the CDBI$_{50}$ of the first ethylene interpolymer is higher than the CDBI$_{50}$ of the second ethylene interpolymer.

The $M_w/M_n$ of second ethylene interpolymer is higher than the $M_w/M_n$ of the first ethylene interpolymer. The upper limit on the $M_w/M_n$ of the second ethylene interpolymer may be about 4.4, in other cases about 4.2 and in still other cases about 4.0. The lower limit on the $M_w/M_n$ of the second ethylene interpolymer may be about 2.2. $M_w/M_n$'s of 2.2 are observed when the melt index of the second ethylene interpolymer is high, or when the melt index of the ethylene interpolymer product is high, e.g. greater than 10 g/10 minutes. In other cases the lower limit on the $M_w/M_n$ of the second ethylene interpolymer may be about 2.4 and in still other cases about 2.6.

The second ethylene interpolymer contains catalyst residues that reflect the chemical composition of heterogeneous catalyst formulation. Those skilled in the art with understand that heterogeneous catalyst residues are typically quantified by the parts per million of metal in the second ethylene interpolymer, where the metal refers to the metal originating from component (vii), i.e. the "metal compound"; hereafter (and in the claims) this metal will be referred to as "metal B". As recited earlier in this disclosure, non-limiting examples of metal B include metals selected from Group 4 through Group 8 of the Periodic Table, or mixtures of metals selected from Group 0.4 through Group 8. The upper limit on the ppm of metal B in the second ethylene interpolymer may be about 12 ppm, in other cases about 10 ppm and in still other cases about 8 ppm. The lower limit on the ppm of metal B in the second ethylene interpolymer may be about 0.5 ppm, in other cases about 1 ppm and in still other cases about 3 ppm. While not wishing to be bound by any particular theory, in series mode of operation it is believed that the chemical environment within the second reactor deactivates the single site catalyst formulation, or; in parallel mode of operation the chemical environment within R2 deactivates the single site catalyst formation.

The amount of hydrogen added to R2 can vary over a wide range which allows the continuous solution process to produce second ethylene interpolymers that differ greatly in melt index, hereafter I$_2^2$. The quantity of hydrogen added is expressed as the parts-per-million (ppm) of hydrogen in R2 relative to the total mass in reactor R2; hereafter H$_2^{R2}$ (ppm). The upper limit on I$_2^2$ may be about 1000 dg/min; in some cases about 750 dg/min; in other cases about 500 dg/min, and; in still other cases about 200 dg/min. The lower limit on I$_2^2$ may be about 0.3 dg/min, in some cases about 0.4 dg/min, in other cases about 0.5 dg/min, and; in still other cases about 0.6 dg/min.

The upper limit on the weight percent (wt %) of the second ethylene interpolymer in the ethylene interpolymer product may be about 85 wt %, in other cases about 80 wt % and in still other cases about 70 wt %. The lower limit on the wt % of the second ethylene interpolymer in the ethylene interpolymer product may be about 30 wt %; in other cases about 40 wt % and in still other cases about 50 wt %.

Third Ethylene Interpolymer

A third ethylene interpolymer is not produced in R3 if a catalyst deactivator is added upstream of R3. If a catalyst deactivator is not added and optional α-olefin is not present then the third ethylene interpolymer produced in R3 is an ethylene homopolymer. If a catalyst deactivator is not added and optional α-olefin is present in R3, the following weight ratio determines the density of the third ethylene interpolymer: ((α-olefin)/(ethylene))$^{R3}$. In the continuous solution polymerization process ((α-olefin)/(ethylene))$^{R3}$ is one of the control parameter used to produce a third ethylene interpolymer with a desired density. Hereafter, the symbol "$\sigma^3$" refers to the density of the ethylene interpolymer produced in R3. The upper limit on $\sigma^3$ may be about 0.975 g/cm$^3$; in some cases about 0.965 g/cm$^3$ and; in other cases about 0.955 g/cm$^3$. Depending on the heterogeneous catalyst formulations used, the lower limit on $\sigma^3$ may be about 0.89 g/cm$^3$, in some cases about 0.90 g/cm$^3$, and; in other cases about 0.91 g/cm$^3$. Optionally, a second heterogeneous catalyst formulation may be added to R3.

Typically, the upper limit on the CDBI$_{50}$ of the optional third ethylene interpolymer (containing an α-olefin) may be about 65%, in other cases about 60% and in still other cases about 55%. The CDBI$_{50}$ of an α-olefin containing optional third ethylene interpolymer will be lower than the CDBI$_{50}$ of the first ethylene interpolymer produced with the single-site catalyst formulation. Typically, the lower limit on the CDBI$_{50}$ of the optional third ethylene interpolymer (containing an α-olefin) may be about 35%, in other cases about 40% and in still other cases about 45%. If an α-olefin is not added to the continuous solution polymerization process the optional third ethylene interpolymer is an ethylene homopolymer. In the case of an ethylene homopolymer the upper limit on the CDBI$_{50}$ may be about 98%, in other cases about 96% and in still other cases about 95%, and; the lower limit on the CDBI$_{50}$ may be about 88%, in other cases about 89% and in still other cases about 90%. Typically, the CDBI$_{50}$ of the first ethylene interpolymer is higher than the CDBI$_{50}$ of the third ethylene interpolymer and second ethylene interpolymer.

The upper limit on the $M_w/M_n$ of the optional third ethylene interpolymer may be about 5.0, in other cases about 4.8 and in still other cases about 4.5. The lower limit on the $M_w/M_n$ of the optional third ethylene interpolymer may be about 2.2, in other cases about 2.4 and in still other cases about 2.6. The $M_w/M_n$ of the optional third ethylene interpolymer is higher than the $M_w/M_n$ of the first ethylene interpolymer. When blended together, the second and third ethylene interpolymer have a fourth $M_w/M_n$ which is not broader than the $M_w/M_n$ of the second ethylene interpolymer.

The catalyst residues in the optional third ethylene interpolymer reflect the chemical composition of the heterogeneous catalyst formulation(s) used, i.e. the first and optionally a second heterogeneous catalyst formulation. The chemical compositions of the first and second heterogeneous catalyst formulations may be the same or different; for example a first component (vii) and a second component (vii) may be used to synthesize the first and second heterogeneous catalyst formulation. As recited above, "metal B" refers to the metal that originates from the first component (vii). Hereafter, "metal C" refers to the metal that originates from the second component (vii). Metal B and optional metal C may be the same, or different. Non-limiting examples of metal B and metal C include metals selected from Group 4 through Group 8 of the Periodic Table, or mixtures of metals selected from Group 4 through Group 8. The upper limit on the ppm of (metal B+metal C) in the optional third ethylene interpolymer may be about 12 ppm, in other cases about 10 ppm and in still other cases about 8 ppm. The lower limit on the ppm of (metal B+metal C) in the optional third ethylene interpolymer may be about 0.5 ppm, in other cases about 1 ppm and in still other cases about 3 ppm.

Optionally hydrogen may be added to R3. Adjusting the amount of hydrogen in R3, hereafter $H_2^{R3}$ (ppm), allows the continuous solution process to produce third ethylene interpolymers that differ widely in melt index, hereafter $I_2^3$. The upper limit on $I_2^3$ may be about 2000 dg/min; in some cases about 1500 dg/min; in other cases about 1000 dg/min, and; in still other cases about 500 dg/min. The lower limit on $I_2^3$ may be about 0.5 dg/min, in some cases about 0.6 dg/min, in other cases about 0.7 dg/min, and; in still other cases about 0.8 dg/min.

The upper limit on the weight percent (wt %) of the optional third ethylene interpolymer in the ethylene interpolymer product may be about 30 wt %, in other cases about 25 wt % and in still other cases about 20 wt %. The lower limit on the wt % of the optional third ethylene interpolymer in the ethylene interpolymer product may be 0 wt %; in other cases about 5 wt % and in still other cases about 10 wt %.

Ethylene Interpolymer Product

The upper limit on the density of the ethylene interpolymer product suitable for caps or closures about 0.970 g/cm$^3$; in some cases about 0.969 g/cm$^3$ and; in other cases about 0.968 g/cm$^3$. The lower limit on the density of the ethylene interpolymer product suitable for caps or closures may be about 0.945 g/cm$^3$, in some cases about 0.947 g/cm$^3$, and; in other cases about 0.948 g/cm$^3$.

The upper limit on the $CDBI_{50}$ of the ethylene interpolymer product may be about 97%, in other cases about 90% and in still other cases about 85%. An ethylene interpolymer product with a $CDBI_{50}$ of 97% may result if an α-olefin is not added to the continuous solution polymerization process; in this case, the ethylene interpolymer product is an ethylene homopolymer. The lower limit on the $CDBI_{50}$ of an ethylene interpolymer may be about 50%, in other cases about 55% and in still other cases about 60%.

The upper limit on the $M_w/M_n$ of the ethylene interpolymer product may be about 6, in other cases about 5 and in still other cases about 4. The lower limit on the $M_w/M_n$ of the ethylene interpolymer product may be 2.0, in other cases about 2.2 and in still other cases about 2.4.

The catalyst residues in the ethylene interpolymer product reflect the chemical compositions of: the single-site catalyst formulation employed in R1; the first heterogeneous catalyst formulation employed in R2, and; optionally the first or optionally the first and second heterogeneous catalyst formulation employed in R3. In this disclosure, catalyst residues were quantified by measuring the parts per million of catalytic metal in the ethylene interpolymer products. In addition, the elemental quantities (ppm) of magnesium, chlorine and aluminum were quantified. Catalytic metals originate from two or optionally three sources, specifically: 1) "metal A" that originates from component (i) that was used to form the single-site catalyst formulation; (2) "metal B" that originates from the first component (vii) that was used to form the first heterogeneous catalyst formulation, and; (3) optionally "metal C" that originates from the second component (vii) that was used to form the optional second heterogeneous catalyst formulation. Metals A, B and C may be the same or different. In this disclosure the term "total catalytic metal" is equivalent to the sum of catalytic metals A+B+C. Further, in this disclosure the terms "first total catalytic metal" and "second total catalyst metal" are used to differentiate between the first ethylene interpolymer product of this disclosure and a comparative "polyethylene composition" that were produced using different catalyst formulations.

The upper limit on the ppm of metal A in the ethylene interpolymer product may be about 0.6 ppm, in other cases about 0.5 ppm and in still other cases about 0.4 ppm. The lower limit on the ppm of metal A in the ethylene interpolymer product may be about 0.001 ppm, in other cases about 0.01 ppm and in still other cases about 0.03 ppm. The upper limit on the ppm of (metal B+metal C) in the ethylene interpolymer product may be about 11 ppm, in other cases about 9 ppm and in still other cases about 7 ppm. The lower limit on the ppm of (metal B+metal C) in the ethylene interpolymer product may be about 0.5 ppm, in other cases about 1 ppm and in still other cases about 3 ppm.

In some embodiments, ethylene interpolymers may be produced where the catalytic metals (metal A, metal B and metal C) are the same metal; a non-limiting example would be titanium. In such embodiments, the ppm of (metal B+metal C) in the ethylene interpolymer product is calculated using equation (VII):

$$ppm^{(B+C)} = ((ppm^{(A+B+C)} - (f^A \times ppm^A))/(1 - f^A) \quad (VII)$$

where: $ppm^{(B+C)}$ is the calculated ppm of (metal B+metal C) in the ethylene interpolymer product; $ppm^{(A+B+C)}$ is the total ppm of catalyst residue in the ethylene interpolymer product as measured experimentally, i.e. (metal A ppm+metal B ppm+metal C ppm); $f^A$ represents the weight fraction of the first ethylene interpolymer in the ethylene interpolymer product, $f^A$ may vary from about 0.15 to about 0.6, and; $ppm^A$ represents the ppm of metal A in the first ethylene interpolymer. In equation (VII) $ppm^A$ is assumed to be 0.35 ppm.

Embodiments of the ethylene interpolymer products disclosed herein have lower catalyst residues relative to the polyethylene polymers described in U.S. Pat. No. 6,277,931. Higher catalyst residues in U.S. Pat. No. 6,277,931 increase the complexity of the continuous solution polymerization process; an example of increased complexity includes additional purification steps to remove catalyst residues from the polymer. In contrast, in the present disclosure, catalyst residues are not removed. In this disclosure, the upper limit on the "total catalytic metal", i.e. the total ppm of (metal A ppm+metal B ppm+optional metal C ppm) in the ethylene interpolymer product may be about 11 ppm, in other cases about 9 ppm and in still other cases about 7, and; the lower limit on the total ppm of catalyst residuals (metal A+metal B+optional metal C) in the ethylene interpolymer product may be about 0.5 ppm, in other cases about 1 ppm and in still other cases about 3 ppm.

The upper limit on melt index of the ethylene interpolymer product may be about 15 dg/min, in some cases about 14 dg/min; in other cases about 12 dg/min, and; in still other cases about 10 dg/min. The lower limit on the melt index of the ethylene interpolymer product may be about 0.5 dg/min, in some cases about 0.6 dg/min; in other cases about 0.7 dg/min, and; in still other cases about 0.8 dg/min.

A computer generated ethylene interpolymer product is illustrated in Table 1; this simulations was based on fundamental kinetic models (with kinetic constants specific for each catalyst formulation) as well as feed and reactor conditions. The simulation was based on the configuration of the solution pilot plant described below; which was used to produce the examples of ethylene interpolymer products disclosed herein. Simulated Example 13 was synthesized using a single-site catalyst formulation (PIC-1) in R1 and an in-line Ziegler-Natta catalyst formulation in R2 and R3. Table 1 discloses a non-limiting example of the density, melt index and molecular weights of the first, second and third ethylene interpolymers produced in the three reactors (R1, R2 and R3); these three interpolymers are combined to produce Simulated Example 13 (the ethylene polymer product). As shown in Table 1, the Simulated Example 13 product has a density of 0.9169 g/cm$^3$, a melt index of 1.0 dg/min, a branch frequency of 12.1 (the number of $C_6$-branches per 1000 carbon atoms (1-octene comonomer)) and a $M_w/M_n$ of 3.11. Simulated Example 13 comprises: a first, second and third ethylene interpolymer having a first, second and third melt index of 0.31 dg/min, 1.92 dg/min and 4.7 dg/min, respectively; a first, second and third density of 0.9087 g/cm$^3$, 0.9206 g/cm$^3$ and 0.9154 g/cm$^3$, respectively; a first, second and third $M_w/M_n$ of 2.03 $M_w/M_n$, 3.29 $M_w/M_n$ and 3.28 $M_w/M_n$, respectively, and; a first, second and third $CDBI_{50}$ of 90 to 95%, 55 to 60% and 45 to 55%, respectively. The simulated production rate of Simulated Example 13 was 90.9 kg/hr and the R3 exit temperature was 217.1° C.

Ethylene Interpolymer Products Suitable for Caps and Closures

Tables 2A through 2C summarize solution pilot plant process conditions used to manufacture: ethylene interpolymer product Example 81 and Comparative Example 20 both having a target density of about 0.953 g/cm$^3$ and a target melt index of about 1.5 dg/min, and; ethylene interpolymer product Example 91 and Comparative Example 30 both having a target density of about 0.958 g/cm$^3$ and a target melt index of about 7.0 dg/min). Example 81 was manufactured using a single-site catalyst formulation in reactor 1 and an in-line Ziegler-Natta catalyst formulation in reactor 2. The production rate of Example 81 was 15% higher relative to Comparative Example 20; the latter was manufactured using a single-site catalyst in both reactors 1 and 2. Example 91 was manufactured using a single-site catalyst formulation in reactor 1 and an in-line Ziegler-Natta catalyst formulation in reactor 2. The production rate of Example 91 was 26% higher relative to Comparative Example 30; the latter was manufactured using a single-site catalyst in both reactors 1 and 2. Examples 81 and 91 and Comparative Examples 20 and 30 were produced with reactor 1 and 2 configured in series, i.e. the effluent from reactor 1 flowed directly into reactor 2. In all examples the comonomer used was 1-octene.

Table 3 compares the physical properties of Example 81 with Comparatives Q and V. Comparatives Q is a commercial caps and closure ethylene interpolymer available from NOVA Chemicals Inc. designated CCs153-A (0.9530 gcm$^3$ and 1.4 dg/min); which was produced in a dual reactor solution process using a single-site catalyst. Comparative V is a commercial caps and closure ethylene interpolymer available from The Dow Chemical Company, Continuum DMDA-1250 NT 7 (0.9550 g/cm$^3$, 1.5 dg/min), produced in a dual reactor gas phase process using a Ziegler-Natta catalyst; which was produced in a dual reactor gas phase process using a batch Ziegler-Natta catalyst formulation.

Figure 1:
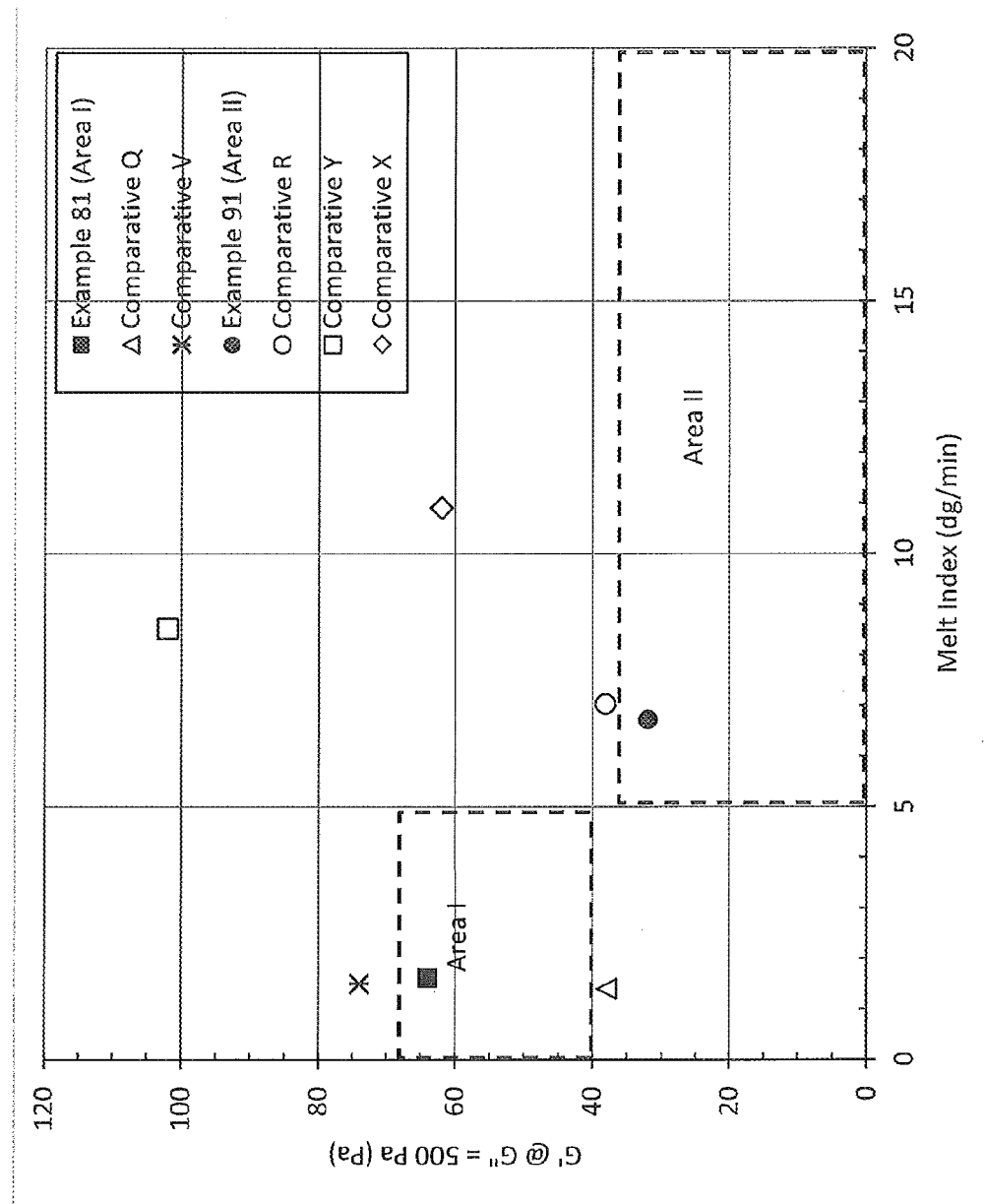
FIG. 1 plots G'[@G"=500 Pa] versus melt index of ethylene interpolymer products Example 81 and 91; as well as Comparatives Q, V, R, Y and X. Examples 81 and 91 (solid symbols) are examples of ethylene interpolymer products disclosed herein. Comparatives Q and R are comparative caps and closure HDPE resins available from NOVA Chemicals Inc.; CCs153 (0.9530 gcm³, 1.4 dg/min) and CCs757 (0.9589 g/cm³, 6.7 dg/min), respectively, produced in a dual reactor solution process using a single-site catalyst. Comparative V is a commercial caps and closure HDPE resin available from The Dow Chemical Company, Continuum DMDA-1250 NT 7 (0.957 g/cm³, 1.5 dg/min), produced in a dual reactor gas phase process using a Ziegler-Natta catalsyt. Comparative X and Y are a commercial caps and closure HDPE resins available from INEOS Olefins & Polymers USA; INEOS HDPE J50-1000-178 (0.951 g/cm³, 11 dg/min) and INEOS HDPE J60-800-178 (0.961 g/cm³, 7.9 dg/min), respectively.

As shown in FIG. 1, the rectangle defined by Area I, defines a melt index region that ranges from about ≥0.4 dg/min to ≤5 dg/min. Within Area I, the disclosed ethylene interpolymer product, Example 81, has a value of G'[@G"=500 Pa] that is desirable in the manufacture of caps and closures using compression molding processes. Specifically, Example 81 has G'[@G"=500 Pa] values from ≥40 Pa to ≤70 Pa; and these values are intermediate between Comparative Q and Comparative V. Elaborating, polymer melt elasticity, as measured by the storage modulus G', affects the compression molding manufacturing process. Generally, the higher the G', the higher the die swell of a polymer melt. A melt index of less than 5 for ethylene interpolymers is useful in the production of caps and closures using continuous compression molding (CCM) processes. CCM uses a nozzle with a specified diameter to extrude a specific quantity of polymer melt, followed by high-speed knife cutting to form a molten pellet. The pellet is then placed into a mold and compression molded to form a closure. The proper die swell characteristics (controlled through the proper selection of the G' value), which is possessed by Example 81 are advantageous in the selection of a nozzle and controlling die swell, thus improving the CCM process; for example, reducing or eliminating the undesirable phenomenon of pellet bouncing.

Table 3 compares the physical properties of Example 91 with Comparatives R, Y and X. Comparative R is a commercial caps and closure ethylene interpolymer available from NOVA Chemicals Inc. designated CCs757 (0.9530 gcm$^3$ and 1.4 dg/min); which was produced in a dual reactor solution process using a single-site catalyst; Comparatives Y and X are commercial caps and closure ethylene interpolymer available from INEOS Olefins & Polymers USA; INEOS HDPE J50-1000-178 and INEOS HDPE J60-800-178, respectively.

As shown in FIG. 1, the rectangle defined by Area II, defines a melt index region that ranges from >5 dg/min to ≤20 dg/min. Within Area II, the disclosed ethylene interpolymer product, Example 91, has a value of G'[@G"=500 Pa] that is desirable in the manufacture of caps and closures using injection molding processes. Specifically, Example 91 has G'[@G"=500 Pa] values from ≥1 Pa to ≤35 Pa; and these values are lower than Comparatives R, Y and X. Elaborating, higher melt indexes (5 to 20 dg/min) are useful for cap and closure manufacturing in injection molding processes, i.e. higher melt indexes reduce residual stresses (crystallized into the part) that may cause warped surface within the cap or closure. Lower melt elasticity, as indicated by lower G' values, increases the degree of polymer chain relaxation, which dissipates residual stresses, allowing the production of caps and closures having the required shape and dimensions. Certainly, caps and closures having the expected dimensions, or the "as designed" dimensions, are advantageous in downstream processing; e.g. in downstream processes where bottles are filled and the cap or closure is fitted to the bottle. Currently commercial polyethylene materials which combine the properties of a homogeneous ethylene interpolymer and a heterogeneous ethylene interpolymer do not exist in the 5 to 20 melt index range.

Dilution Index ($Y_d$) of Ethylene Interpolymer Products

Figure 2:
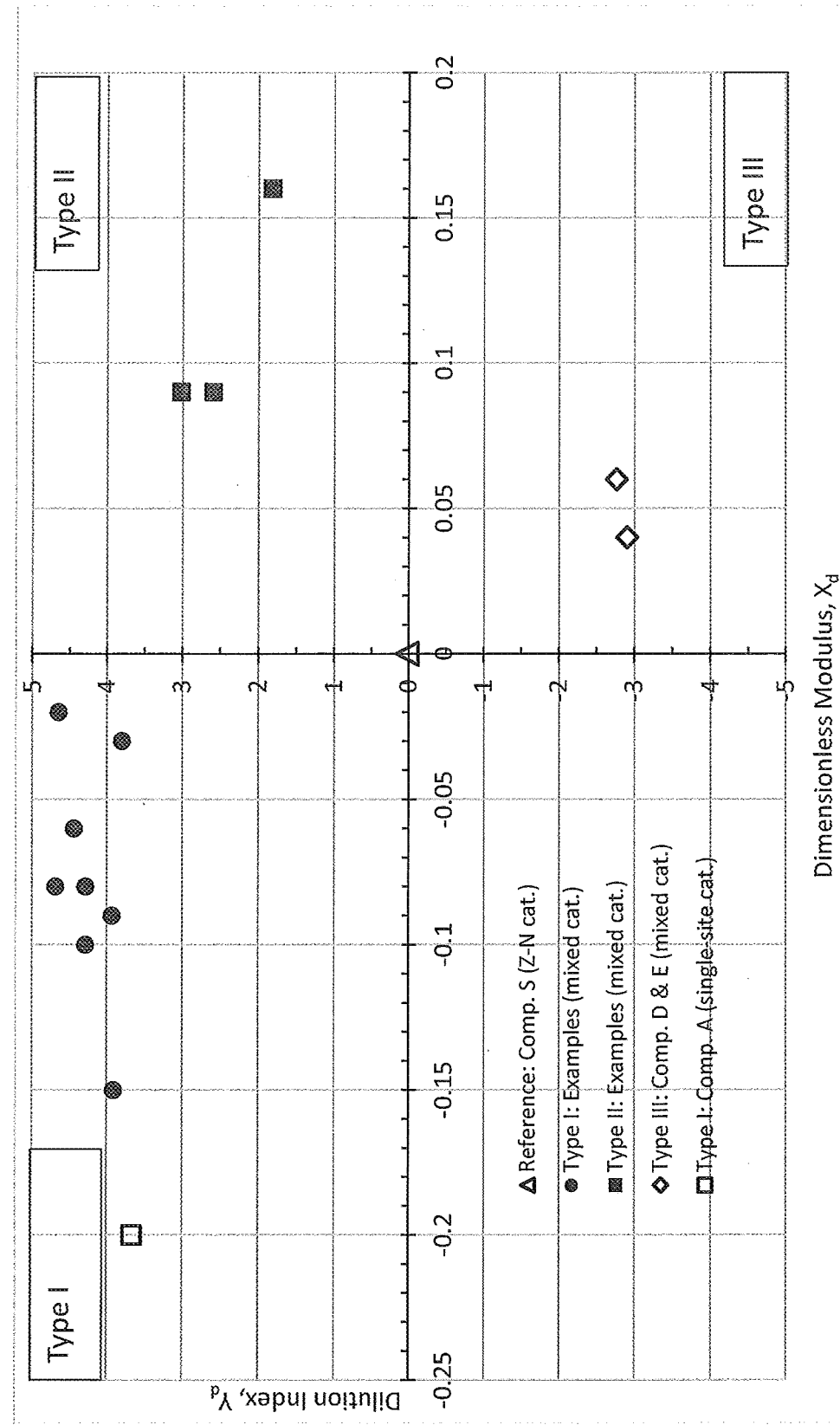

In FIG. 2 the Dilution Index ($Y_d$, having dimensions of ° (degrees)) and Dimensionless Modulus ($X_d$) are plotted for several embodiments of the ethylene interpolymer products disclosed herein (the solid symbols), as well as comparative ethylene interpolymer products, i.e. Comparative A, D, E and S. Further, FIG. 2 defines the following three quadrants:

Type I: $Y_d>0$ and $X_d<0$;
Type II: $Y_d>0$ and $X_d>0$, and;
Type III: $Y_d<0$ and $X_d>0$.

The data plotted in FIG. 2 is also tabulated in Table 4. In FIG. 2, Comparative S (open triangle) was used as the rheological reference in the Dilution Index test protocol. Comparative S is an ethylene interpolymer product comprising an ethylene interpolymer synthesized using an in-line Ziegler-Natta catalyst in one solution reactor, i.e. SCLAIR® FP120-C which is an ethylene/1-octene interpolymer available from NOVA Chemicals Company (Calgary, Alberta, Canada). Comparatives D and E (open diamonds, $Y_d<0$, $X_d>0$) are ethylene interpolymer products comprising a first ethylene interpolymer synthesized using a single-site catalyst formation and a second ethylene interpolymer synthesized using a batch Ziegler-Natta catalyst formulation employing a dual reactor solution process, i.e. Elite® 5100G and Elite® 5400G, respectively, both ethylene/1-octene interpolymers available from The Dow Chemical Company (Midland, Mich., USA). Comparative A (open square, $Y_d>0$ and $X_d<0$) was an ethylene interpolymer product comprising a first and second ethylene interpolymer synthesized using a single-site catalyst formation in a dual reactor solution process, i.e. SURPASS® FPs117-C which is an ethylene/1-octene interpolymer available from NOVA Chemicals Company (Calgary, Alberta, Canada).

The following defines the Dilution Index ($Y_d$) and Dimensionless Modulus ($X_d$). In addition to having molecular weights, molecular weight distributions and branching structures, blends of ethylene interpolymers may exhibit a hierarchical structure in the melt phase. In other words, the ethylene interpolymer components may be, or may not be, homogeneous down to the molecular level depending on interpolymer miscibility and the physical history of the blend. Such hierarchical physical structure in the melt is expected to have a strong impact on flow and hence on processing and converting; as well as the end-use properties of manufactured articles. The nature of this hierarchical physical structure between interpolymers can be characterized.

The hierarchical physical structure of ethylene interpolymers can be characterized using melt rheology. A convenient method can be based on the small amplitude frequency sweep tests. Such rheology results are expressed as the phase angle $\delta$ as a function of complex modulus $G^*$, referred to as van Gurp-Palmen plots (as described in M. Van Gurp, J. Palmen, Rheol. Bull. (1998) 67(1): 5-8, and; Dealy J, Plazek D. Rheol. Bull. (2009) 78(2): 16-31). For a typical ethylene interpolymer, the phase angle $\delta$ increases toward its upper bound of 90° with $G^*$ becoming sufficiently low. A typical VGP plot is shown in FIG. 3. The VGP plots are a signature of resin architecture. The rise of $\delta$ toward 90° is monotonic for an ideally linear, monodisperse interpolymer. The $\delta(G^*)$ for a branched interpolymer or a blend containing a branched interpolymer may show an inflection point that reflects the topology of the branched interpolymer (see S. Trinkle, P. Walter, C. Friedrich, Rheo. Acta (2002) 41: 103-113). The deviation of the phase angle $\delta$ from the monotonic rise may indicate a deviation from the ideal linear interpolymer either due to presence of long chain branching if the inflection point is low (e.g., $\delta \leq 20°$) or a blend containing at least two interpolymers having dissimilar branching structure if the inflection point is high (e.g., $\delta \geq 70°$).

For commercially available linear low density polyethylenes, inflection points are not observed; with the exception of some commercial polyethylenes that contain a small amount of long chain branching (LCB). To use the VGP plots regardless of presence of LCB, an alternative is to use the point where the frequency $\omega_c$ is two decades below the cross-over frequency $\omega_c$, i.e., $\omega_c=0.01\omega_x$. The cross-over point is taken as the reference as it is known to be a characteristic point that correlates with MI, density and other specifications of an ethylene interpolymer. The cross-over modulus is related to the plateau modulus for a given molecular weight distribution (see S. Wu. J Polym Sci, Polym Phys Ed (1989) 27:723; M. R. Nobile, F. Cocchini. Rheol Acta (2001) 40:111). The two decade shift in phase angle $\delta$ is to find the comparable points where the individual viscoelastic responses of constituents could be detected; to be more clear, this two decade shift is shown in FIG. 4. The complex modulus $G_c^*$ for this point is normalized to the cross-over modulus, $G_x^*/(\sqrt{2})$, as $(\sqrt{2})G_c^*/G_x^*$, to minimize the variation due to overall molecular weight, molecular weight distribution and the short chain branching. As a result, the coordinates on VGP plots for this low frequency point at $\omega_c=0.01\omega_x$, namely $(\sqrt{2})G_c^*/G_x^*$ and $\delta_c$, characterize the contribution due to blending. Similar to the inflection points, the closer the $((\sqrt{2})G_c^*/G_x^*, \delta_c)$ point is toward the 90° upper bound, the more the blend behaves as if it were an ideal single component.

As an alternative way to avoid interference due to the molecular weight, molecular weight distribution and the short branching of the ethylene $\delta_c$ interpolymer ingredients, the coordinates ($G_c^*$, $\delta_c$) are compared to a reference sample of interest to form the following two parameters:

"Dilution Index($Y_d$)"

$$Y_d=\delta_c-(C_0-C_1 e^{C_2 \ln G_c*})$$

"Dimensionless Modulus($X_d$)"

$$X_d=G_{0.01\omega_c}^*/G_r^*$$

The constants $C_0$, $C_1$, and $C_2$ are determined by fitting the VGP data $\delta(G^*)$ of the reference sample to the following equation:

$$\delta=C_0-C_1 e^{C_2 \ln G*}$$

$G_r^*$ is the complex modulus of this reference sample at its $\delta_c=\delta(0.01\omega_x)$. When an ethylene interpolymer, synthesized with an in-line Ziegler-Natta catalyst employing one solution reactor, having a density of 0.920 g/cm³ and a melt index (MI or $I_2$) of 1.0 dg/min is taken as a reference sample, the constants are:

$C_0$=93.43°
$C_1$=1.316°
$C_2$=0.2945
$G_r^*$=9432 Pa.

The values of these constants can be different if the rheology test protocol differs from that specified herein.

These regrouped coordinates ($X_d$, $Y_d$) from ($G_c^*$, $\delta_c$) allows comparison between ethylene interpolymer products disclosed herein with Comparative examples. The Dilution Index ($Y_d$) reflects whether the blend behaves like a simple blend of linear ethylene interpolymers (lacking hierarchical structure in the melt) or shows a distinctive response that reflects a hierarchical physical structure within the melt. The lower the $Y_d$, the more the sample shows separate responses from the ethylene interpolymers that comprise the blend; the higher the $Y_d$ the more the sample behaves like a single component, or single ethylene interpolymer.

Returning to FIG. 2: Type I (upper left quadrant) ethylene interpolymer products of this disclosure (solid symbols) have $Y_d > 0$; in contrast, Type III (lower right quadrant) comparative ethylene interpolymers, Comparative D and E have $Y_d < 0$. In the case of Type I ethylene interpolymer products (solid circles), the first ethylene interpolymer (single-site catalyst) and the second ethylene interpolymer (in-line Ziegler Natta catalyst) behave as a simple blend of two ethylene interpolymers and a hierarchical structure within the melt does not exist. However, in the case of Comparatives D and E (open diamonds), the melt comprising a first ethylene interpolymer (single-site catalyst) and a second ethylene interpolymer (batch Ziegler Natta catalyst) possesses a hierarchical structure.

The ethylene interpolymer products of this disclosure fall into one of two quadrants: Type I with $X_d < 0$, or; Type II with $X_d > 0$. The Dimensionless Modulus ($X_d$), reflects differences (relative to the reference sample) that are related to the overall molecular weight, molecular weight distribution ($M_w/M_n$) and short chain branching. Not wishing to be bound by theory, conceptually, the Dimensionless Modulus ($X_d$) may be considered to be related to the $M_w/M_n$ and the radius of gyration ($<R_g>^2$) of the ethylene interpolymer in the melt; conceptually, increasing $X_d$ has similar effects as increasing $M_w/M_n$ and/or $<R_g>^2$, without the risk of including lower molecular weight fraction and sacrificing certain related properties.

Relative to Comparative A (recall that Comparative A comprises a first and second ethylene interpolymer synthesized with a single-site catalyst) the solution process disclosed herein enables the manufacture of ethylene interpolymer products having higher $X_d$. Not wishing to be bound by theory, as $X_d$ increases the macromolecular coils of higher molecular weight fraction are more expanded (conceptually higher $<R_g>^2$) and upon crystallization the probability of tie chain formation is increased resulting in higher toughness properties; the polyethylene art is replete with disclosures that correlate higher toughness (for example improved ESCR and/or PENT in molded articles) with an increasing probability of tie chain formation.

In the Dilution Index testing protocol, the upper limit on $Y_d$ may be about 20, in some cases about 15 and is other cases about 13. The lower limit on $Y_d$ may be about −30, in some cases −25, in other cases −20 and in still other cases −15.

In the Dilution Index testing protocol, the upper limit on $X_d$ is 1.0, in some cases about 0.95 and in other cases about 0.9. The lower limit on $X_d$ is −2, in some cases −1.5 and in still other cases −1.0.

Terminal Vinyl Unsaturation of Ethylene Interpolymer Products

The ethylene interpolymer products of this disclosure are further characterized by a terminal vinyl unsaturation greater than or equal to 0.03 terminal vinyl groups per 100 carbon atoms (≥0.03 terminal vinyls/100 C); as determine via Fourier Transform Infrared (FTIR) spectroscopy according to ASTM ASTM D3124-98 and ASTM D6248-98.

FIG. 5 compares the terminal vinyl/100 C content of the ethylene interpolymers of this disclosure with several Comparatives. The data shown in FIG. 5 is also tabulated in Tables 5A and 5B. All of the comparatives in FIG. 5 and Tables 5A and 5B are Elite® products available from The Dow Chemical Company (Midland, Mich., USA); Elite products are ethylene interpolymers produced in a dual reactor solution process and comprise an interpolymer synthesized using a single-site catalyst and an interpolymer synthesized using a batch Ziegler-Natta catalyst: Comparative B is Elite 5401G; Comparative C is Elite 5400G; Comparative E and E2 are Elite 5500G; Comparative G is Elite 5960; Comparative H and H2 are Elite 5100G; Comparative I is Elite 5940G, and; Comparative J is Elite 5230G.

As shown in FIG. 5 the average terminal vinyl content in the ethylene interpolymer of this disclosure was 0.045 terminal vinyls/100 C; the terminal vinyl unsaturation of Example 81 and 91 were close to this average, i.e. 0.044 and 0.041 terminal vinyl/100 C, respectively. In contrast, the average terminal vinyl content in the Comparative samples was 0.023 terminal vinyls/100 C. Similar to Examples 81 and 91, the Comparatives shown in FIG. 5 also comprise a first ethylene interpolymer synthesized with a single-site catalyst formulation and a second ethylene interpolymer synthesized with a heterogeneous catalyst formulation. Statistically, at the 99.999% confidence level, the ethylene interpolymers of this disclosure are significantly different from the Comparatives of FIG. 5; i.e. a t-Test assuming equal variances shows that the means of the two populations (0.045 and 0.023 terminal vinyls/100 C) are significantly different at the 99.999% confidence level (t(obs)= 12.891>3.510 t(crit two tail); or p-value=$4.84 \times 10^{-17}$< 0.001α (99.999% confidence)).

Catalyst Residues (Total Catalytic Metal)

The ethylene interpolymer products of this disclosure are further characterized by having ≥3 parts per million (ppm) of total catalytic metal (Ti); where the quantity of catalytic metal was determined by Neutron Activation Analysis (N.A.A.) as specified herein.

FIG. 6 compares the total catalytic metal content of the disclosed ethylene interpolymers with several Comparatives; FIG. 6 data is also tabulated in Tables 6A and 6B. All of the comparatives in FIG. 6 and Tables 6A and 6B are Elite® products available from The Dow Chemical Company (Midland, Mich., USA), for additional detail see the section above.

As shown in FIG. 6 the average total catalytic metal content in the ethylene interpolymers of this disclosure was 7.02 ppm of titanium. Although elemental analysis (N.A.A.) was not completed on Examples 81 and 91; FIG. 5 clearly shows that 7.02 ppm of titanium is a reasonable estimate (as reported in Table 3) for residual titanium in Examples 81 and 91. In contrast, the average total catalytic metal in the Comparative samples shown in FIG. 6 was 1.63 ppm of titanium. Statistically, at the 99.999% confidence level, the ethylene interpolymers of this disclosure are significantly different from the Comparatives, i.e. a t-Test assuming equal variances shows that the means of the two populations (7.02 and 1.63 ppm titanium) are significantly different at the 99.999% confidence level, i.e. (t(obs)=12.71>3.520 t(crit two tail); or p-value=$1.69 \times 10^{-16}$<0.001α (99.999% confidence)).

Rigid Manufactured Articles

There is a need for ethylene interpolymer products having optimized density, melt index and G'[@G"=500 Pa] for compression molding processes. Further, there is a need for ethylene interpolymer products having optimized density, melt index and G'[@G"=500 Pa] for injection molding processes. There is also a need to improve the stiffness of caps and closures articles, while maintaining or increasing the Environmental Stress Crack Resistance (ESCR). The ethylene interpolymer products disclosed herein are well suited to satisfy these needs.

Additional non-limiting applications where the disclosed ethylene interpolymer products may be used include: deli containers, margarine tubs, trays, cups, lids, bottles, bottle cap liners, pails, crates, drums, bumpers, industrial bulk containers, industrial vessels, material handling containers, playground equipment, recreational equipment, safety equipment, wire and cable applications (power cables, communication cables and conduits), tubing and hoses, pipe applications (pressure pipe and non-pressure pipe, e.g. natural gas distribution, water mains, interior plumbing, storm sewer, sanitary sewer, corrugated pipes and conduit), foamed articles (foamed sheet or bun foam), military packaging (equipment and ready meals), personal care packaging (diapers and sanitary products), cosmetic, pharmaceutical and medical packaging, truck bed liners, pallets and automotive dunnage. The rigid manufactured articles summarized in this paragraph contain one or more of the ethylene interpolymer products having improved heat deflection temperature (HDT), faster crystallization rate (reduced $t_{1/2}$) and higher melt strength. Such rigid manufactured articles may be fabricated using the conventional injection molding, compression molding and blow molding techniques.

The desired physical properties of rigid manufactured articles depend on the application of interest. Non-limiting examples of desired properties include: elasticity (G'), stiffness, flexural modulus (1% and 2% secant modulus); tensile toughness; environmental stress crack resistance (ESCR); slow crack growth resistance (PENT); abrasion resistance; shore hardness; heat deflection temperature (HDT); VICAT softening point; IZOD impact strength; ARM impact resistance; Charpy impact resistance, and; color (whiteness and/or yellowness index).

Additives and Adjuvants

The ethylene interpolymer products and the caps and closures claimed may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, heat stabilizers, light absorbers, lubricants, pigments, plasticizers, nucleating agents and combinations thereof.

Testing Methods

Prior to testing, each specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Density

Ethylene interpolymer product densities were determined using ASTM D792-13 (Nov. 1, 2013).

Melt Index

Ethylene interpolymer product melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship:

$$S.Ex.=\log(I_6/I_2)/\log(6480/2160)$$

wherein $I_6$ and $I_2$ are the melt flow rates measured at 190° C. using 6.48 kg and 2.16 kg loads, respectively. In this disclosure, melt index was expressed using the units of g/10 minutes or g/10 min or dg/minutes or dg/min; these units are equivalent.

Environmental Stress Crack Resistance (ESCR)

ESCR was determined according to ASTM D1693-13 (Nov. 1, 2013). Condition B was used, with a specimen thickness with the range of 1.84 to 1.97 mm (0.0725 to 0.0775 in) and a notch depth in the range of 0.30 to 0.40 mm (0.012 to 0.015 in). The concentration of Igepal used was 10 volume %.

Gel Permeation Chromatography (GPC)

Ethylene interpolymer product molecular weights, $M_n$, $M_w$ and $M_z$, as well the as the polydispersity ($M_w/M_n$), were determined using ASTM D6474-12 (Dec. 15, 2012). This method illuminates the molecular weight distributions of ethylene interpolymer products by high temperature gel permeation chromatography (GPC). The method uses commercially available polystyrene standards to calibrate the GPC.

Unsaturation Content

The quantity of unsaturated groups, i.e. double bonds, in an ethylene interpolymer product was determined according to ASTM D3124-98 (vinylidene unsaturation, published March 2011) and ASTM D6248-98 (vinyl and trans unsaturation, published July 2012). An ethylene interpolymer sample was: a) first subjected to a carbon disulfide extraction to remove additives that may interfere with the analysis; b) the sample (pellet, film or granular form) was pressed into a plaque of uniform thickness (0.5 mm), and; c) the plaque was analyzed by FTIR.

Comonomer Content

The quantity of comonomer in an ethylene interpolymer product was determined by FTIR (Fourier Transform Infrared spectroscopy) according to ASTM D6645-01 (published January 2010).

Composition Distribution Branching Index (CDBI)

The "Composition Distribution Branching Index" or "CDBI" of the disclosed Examples and Comparative Examples were determined using a crystal-TREF unit commercially available form Polymer ChAR (Valencia, Spain). The acronym "TREF" refers to Temperature Rising Elution Fractionation. A sample of ethylene interpolymer product (80 to 100 mg) was placed in the reactor of the Polymer ChAR crystal-TREF unit, the reactor was filled with 35 ml of 1,2,4-trichlorobenzene (TCB), heated to 150° C. and held at this temperature for 2 hours to dissolve the sample. An aliquot of the TCB solution (1.5 mL) was then loaded into the Polymer ChAR TREF column filled with stainless steel beads and the column was equilibrated for 45 minutes at 110° C. The ethylene interpolymer product was then crystallized from the TCB solution, in the TREF column, by slowly cooling the column from 110° C. to 30° C. using a cooling rate of 0.09° C. per minute. The TREF column was then equilibrated at 30° C. for 30 minutes. The crystallized ethylene interpolymer product was then eluted from the TREF column by passing pure TCB solvent through the column at a flow rate of 0.75 mL/minute as the temperature of the column was slowly increased from 30° C. to 120° C. using a heating rate of 0.25° C. per minute. Using Polymer ChAR software a TREF distribution curve was generated as the ethylene interpolymer product was eluted from the TREF column, i.e. a TREF distribution curve is a plot of the quantity (or intensity) of ethylene interpolymer eluting from the column as a function of TREF elution temperature. A $CDBI_{50}$ was calculated from the TREF distribution curve for each ethylene interpolymer product analyzed. The "$CDBI_{50}$" is defined as the percent of ethylene interpolymer whose composition is within 50% of the median comonomer composition (25% on each side of the median comonomer composition); it is calculated from the TREF composition distribution curve and the normalized cumulative integral of the TREF composition distribution curve. Those skilled in the art will understand that a calibration curve is required to convert a TREF elution temperature to comonomer content, i.e. the amount of comonomer in the ethylene interpolymer fraction that elutes at a specific temperature. The generation of such calibration curves are described in the prior art, e.g. Wild, et al., J. Polym. Sci., Part B, Polym. Phys., Vol. 20 (3), pages 441-455: hereby fully incorporated by reference.

Heat Deflection Temperature

The heat deflection temperature of an ethylene interpolymer product was determined using ASTM D648-07 (approved Mar. 1, 2007). The heat deflection temperature is the temperature at which a deflection tool applying 0.455 MPa (66 PSI) stress on the center of a molded ethylene interpolymer plaque (3.175 mm (0.125 in) thick) causes it to deflect 0.25 mm (0.010 in) as the plaque is heated in a medium at a constant rate.

Vicat Softening Point (Temperature)

The Vicat softening point of an ethylene interpolymer product was determined according to ASTM D1525-07 (published December 2009). This test determines the temperature at which a specified needle penetration occurs when samples are subjected to ASTM D1525-07 test conditions, i.e. heating Rate B (120±10° C./hr and 938 gram load (10±0.2N load).

Neutron Activation Analysis (NAA)

Neutron Activation Analysis, hereafter NAA, was used to determine catalyst residues in ethylene interpolymers and was performed as follows. A radiation vial (composed of ultrapure polyethylene, 7 mL internal volume) was filled with an ethylene interpolymer product sample and the sample weight was recorded. Using a pneumatic transfer system the sample was placed inside a SLOWPOKE™ nuclear reactor (Atomic Energy of Canada Limited, Ottawa, Ontario, Canada) and irradiated for 30 to 600 seconds for short half-life elements (e.g., Ti, V, Al, Mg, and Cl) or 3 to 5 hours for long half-life elements (e.g. Zr, Hf, Cr, Fe and Ni). The average thermal neutron flux within the reactor was $5\times10^{11}/cm^2/s$. After irradiation, samples were withdrawn from the reactor and aged, allowing the radioactivity to decay; short half-life elements were aged for 300 seconds or long half-life elements were aged for several days. After aging, the gamma-ray spectrum of the sample was recorded using a germanium semiconductor gamma-ray detector (Ortec model GEM55185, Advanced Measurement Technology Inc., Oak Ridge, Tenn., USA) and a multichannel analyzer (Ortec model DSPEC Pro). The amount of each element in the sample was calculated from the gamma-ray spectrum and recorded in parts per million relative to the total weight of the ethylene interpolymer sample. The N.A.A. system was calibrated with Specpure standards (1000 ppm solutions of the desired element (greater than 99% pure)). One mL of solutions (elements of interest) were pipetted onto a 15 mm×800 mm rectangular paper filter and air dried. The filter paper was then placed in a 1.4 mL polyethylene irradiation vial and analyzed by the N.A.A. system. Standards are used to determine the sensitivity of the N.A.A. procedure (in counts/μg).

Color Index

The Whiteness Index (WI) and Yellowness Index (YI) of ethylene interpolymer products were measured according to ASTM E313-10 (approved in 2010) using a BYK Gardner Color-View colorimeter.

Dilution Index ($Y_d$) Measurements

A series of small amplitude frequency sweep tests were run on each sample using an Anton Paar MCR501 Rotational Rheometer equipped with the "TruGap™ Parallel Plate measuring system". A gap of 1.5 mm and a strain amplitude of 10% were used throughout the tests. The frequency sweeps were from 0.05 to 100 rad/s at the intervals of seven points per decade. The test temperatures were 170°, 190°, 210° and 230° C. Master curves at 190° C. were constructed for each sample using the Rheoplus/32 V3.40 software through the Standard TTS (time-temperature superposition) procedure, with both horizontal and vertical shift enabled.

The $Y_d$ and $X_d$ data generated are summarized in Table 4. The flow properties of the ethylene interpolymer products, e.g., the melt strength and melt flow ratio (MFR) are well characterized by the Dilution Index ($Y_d$) and the Dimensionless Modulus ($X_d$) as detailed below. In both cases, the flow property is a strong function of $Y_d$ and $X_d$ in addition a dependence on the zero-shear viscosity. For example, the melt strength (hereafter MS) values of the disclosed Examples and the Comparative Examples were found to follow the same equation, confirming that the characteristic VGP point $((\sqrt{2})G_c^*/G_x^*, \delta_c)$ and the derived regrouped coordinates ($X_d$, $Y_d$) represent the structure well:

$$MS=a_{00}+a_{10} \log \eta_0-a_{20}(90-\delta_c)-a_{30}((\sqrt{2})G_c^*/G_x^*)-a_{40}(90-\delta_c)((\sqrt{2})G_c^*/G_x^*)$$

where $a_{00}=-33.33$; $a_{10}=9.529$; $a_{20}=0.03517$; $a_{30}=0.894$; $a_{40}=0.02969$ and $r^2=0.984$ and the average relative standard deviation was 0.85%. Further, this relation can be expressed in terms of the Dilution Index ($Y_d$) and the Dimensionless Modulus ($X_d$):

$$MS=a_0+a_1 \log \eta_0+a_2Y_d+a_3X_d+a_4Y_dX_d$$

where $a_0=33.34$; $a_1=9.794$; $a_2=0.02589$; $a_3=0.1126$; $a_4=0.03307$ and $r^2=0.989$ and the average relative standard deviation was 0.89%.

The MFR of the disclosed Examples and the Comparative samples were found to follow a similar equation, further confirming that the dilution parameters $Y_d$ and $X_d$ show that the flow properties of the disclosed Examples differ from the reference and Comparative Examples:

$$MFR=b_0-b_1 \log \eta_0-b_2Y_d-b_3X_d$$

where $b_0=53.27$; $b_1=6.107$; $b_2=1.384$; $b_3=20.34$ and $r^2=0.889$ and the average relative standard deviation and 3.3%.

Further, the polymerization process and catalyst formulations disclosed herein allow the production of ethylene interpolymer products that can be converted into flexible manufactured articles that have a desired balance of physical properties (i.e. several end-use properties can be balanced (as desired) through multidimensional optimization); relative to comparative polyethylenes of comparable density and melt index.

G'[@G"=500 Pa] Parameter

The G'[@G"=500 Pa] parameter was generated using conventional rheological equipment and data processing techniques that is well known to those of ordinary experience in the art. The rheological data was generated on a Rheometrics RDS-II (Rheometrics Dynamic Spectrometer II); which is a Strain Control Rotational Rheometer. The ethylene interpolymer sample analyzed was in the form of a compression molded sample disk; the sample disk is placed in the heated chamber of the RDS-II, between two parallel plate test fixtures; one fixture is attached to an actuator and the other to a transducer. The testing is carried out over a range of frequencies, typically from 0.05 to 100 rad/s, at a fixed strain and a constant temperature of 190° C. This test generates the following data which characterizes the elastic and viscous attributes of a polymer melt: real, elastic or storage modulus (G'), the viscous or loss modulus (G"), complex viscosity $\eta^*$ and tan $\delta$ as a function of frequency (dynamic oscillation). The G'[@G"=500 Pa] parameter was determined as follows: G' is plotted as a function of G" (those with ordinary experience in the art generally refer to this plot as a Cole-Cole plot) and G'[@G"=500 Pa] is simply the G' value (Pa) where G" is equal to 500 Pa. Sample plaques were prepared as follows: (a) for samples having a melt index less than 1.0 dg/min, about 5.5 g of ethylene interpolymer was compression molded at 190° C. into a 1.8 mm thick circular plaque and using a circular punch a 2.5 cm diameter sample disk was punched from the circular plaque and loaded into the RDS-II, or; (b) for samples having a melt index greater than or equal to 1.0 dg/min, about 2.8 g ethylene interpolymer was compression molded at 190° C. into a 0.9 mm thick circular plaque and using a circular punch a 2.8 cm diameter sample disk was punched from the circular plaque and loaded into the RDS-II. The finished plaque should be bubble-free, impurity-free, and have a smooth surface free of any defect.

Tensile Properties

The following tensile properties were determined using ASTM D882-12 (Aug. 1, 2012): tensile break strength (MPa), elongation at yield (%), yield strength (MPa), ultimate elongation (%), ultimate strength (MPa) and 1 and 2% secant modulus (MPa)

Flexural Properties

Flexural properties, i.e. 2% flexural secant modulus was determined using ASTM D790-10 (published in April 2010).

IZOD Impact Strength

IZOD impact strength (ft-lbs/in) was determined using ASTM D256-05 (published January 2005) using a Izod impact pendulum-like tester.

Hexane Extractables

Hexane extractables was determined according to the Code of Federal Registration 21 CFR §177.1520 Para (c) 3.1 and 3.2; wherein the quantity of hexane extractable material in a sample is determined gravimetrically.

EXAMPLES

Polymerization

The following examples are presented for the purpose of illustrating selected embodiments of this disclosure; it being understood, that the examples presented do not limit the claims presented.

Embodiments of ethylene interpolymer products disclosed herein were produced in a continuous solution polymerization pilot plant comprising reactors arranged in a series configuration. Methylpentane was used as the process solvent (a commercial blend of methylpentane isomers). The volume of the first CSTR reactor (R1) was 3.2 gallons (12 L), the volume of the second CSTR reactor (R2) was 5.8 gallons (22 L) and the volume of the tubular reactor (R3) was 4.8 gallons (18 L). Examples of ethylene interpolymer products were produced using an R1 pressure from about 14 MPa to about 18 MPa; R2 was operated at a lower pressure to facilitate continuous flow from R1 to R2. R1 and R2 were operated in series mode, wherein the first exit stream from R1 flows directly into R2. Both CSTR's were agitated to give conditions in which the reactor contents were well mixed. The process was operated continuously by feeding fresh process solvent, ethylene, 1-octene and hydrogen to the reactors.

The single site catalyst components used were: component (i), cyclopentadienyl tri(tertiary butyl)phosphinimine titanium dichloride, $(Cp[(t-Bu)_3PN]TiCl_2)$, hereafter PIC-1; component (ii), methylaluminoxane (MAO-07); component (iii), trityl tetrakis(pentafluoro-phenyl)borate, and; component (iv), 2,6-di-tert-butyl-4-ethylphenol. The single site catalyst component solvents used were methylpentane for components (ii) and (iv) and xylene for components (i) and (iii). The quantity of PIC-1 added to R1, "R1 (i) (ppm)" is shown in Table 2A; to be clear, in Example 81 in Table 2A, the solution in R1 contained 0.13 ppm of component (i), i.e. PIC-1. The mole ratios of the single site catalyst components employed to produce Example 81 were: R1 (ii)/(i) mole ratio=100, i.e. [(MAO-07)/(PIC-1)]; R1 (iv)/(ii) mole ratio=0.0, i.e. [(2,6-di-tert-butyl-4-ethylphenol)/(MAO-07)], and; R1 (iii)/(i) mole ratio=1.1, i.e. [(trityl tetrakis (pentafluoro-phenyl)borate)/(PIC-1)].

The in-line Ziegler-Natta catalyst formulation was prepared from the following components: component (v), butyl ethyl magnesium; component (vi), tertiary butyl chloride; component (vii), titanium tetrachloride; component (viii), diethyl aluminum ethoxide, and; component (ix), triethyl aluminum. Methylpentane was used as the catalyst component solvent. The in-line Ziegler-Natta catalyst formulation was prepared using the following steps. In step one, a solution of triethylaluminum and dibutylmagnesium ((triethylaluminum)/(dibutylmagnesium) molar ratio of 20) was combined with a solution of tertiary butyl chloride and allowed to react for about 30 seconds (HUT-1); in step two, a solution of titanium tetrachloride was added to the mixture formed in step one and allowed to react for about 14 seconds (HUT-2), and; in step three, the mixture formed in step two was allowed to reactor for an additional 3 seconds (HUT-3) prior to injection into R2. The in-line Ziegler-Natta procatalyst formulation was injected into R2 using process solvent, the flow rate of the catalyst containing solvent was about 49 kg/hr. The in-line Ziegler-Natta catalyst formulation was formed in R2 by injecting a solution of diethyl aluminum ethoxide into R2. The quantity of titanium tetrachloride "R2 (vii) (ppm)" added to reactor 2 (R2) is shown in Table 2A; to be clear in Example 81 the solution in R2 contained 3.99 ppm of $TiCl_4$. The mole ratios of the in-line Ziegler-Natta catalyst components are also shown in Table 2A, specifically: R2 (vi)/(v) mole ratio, i.e. [(tertiary butyl chloride)/ (butyl ethyl magnesium)]; R2 (viii)/(vii) mole ratio, i.e. [(diethyl aluminum ethoxide)/(titanium tetrachloride)], and; R2 (ix)/(vii) mole ratio, i.e. [(triethyl aluminum)/(titanium tetrachloride)]. To be clear, in Example 81, the following mole ratios were used to synthesize the in-line Ziegler-Natta catalyst: R2 (vi)/(v) mole ratio=1.83; R2 (viii)/(vii) mole ratio=1.35, and; R2 (ix)/(vii) mole ratio=0.35. In all of the Examples disclosed, 100% of the diethyl aluminum ethoxide was injected directly into R2.

In Example 81 (single-site catalyst formulation in R1+in-line Ziegler-Natty catalyst in R2) the ethylene interpolymer product was produced at a production rate of 93.5 kg/h; in contrast, in Comparative Example 20 (single-site catalyst formulation in both R1 and R2) the maximum production rate of the comparative ethylene interpolymer product was 74 kg/h.

Average residence time of the solvent in a reactor is primarily influenced by the amount of solvent flowing through each reactor and the total amount of solvent flowing through the solution process, the following are representative or typical values for the examples shown in Tables 2A-2C: average reactor residence times were: about 61 seconds in R1, about 73 seconds in R2 and about 50 seconds in R3 (the volume of R3 was about 4.8 gallons (18 L)).

Polymerization in the continuous solution polymerization process was terminated by adding a catalyst deactivator to the third exit stream exiting the tubular reactor (R3). The catalyst deactivator used was octanoic acid (caprylic acid), commercially available from P&G Chemicals, Cincinnati, Ohio, U.S.A. The catalyst deactivator was added such that the moles of fatty acid added were 50% of the total molar amount of titanium and aluminum added to the polymerization process; to be clear, the moles of octanoic acid added=0.5×(moles titanium+moles aluminum); this mole ratio was consistently used in all examples.

A two-stage devolitizing process was employed to recover the ethylene interpolymer product from the process solvent, i.e. two vapor/liquid separators were used and the second bottom stream (from the second V/L separator) was passed through a gear pump/pelletizer combination. DHT-4V (hydrotalcite), supplied by Kyowa Chemical Industry Co. LTD, Tokyo, Japan was used as a passivator, or acid scavenger, in the continuous solution process. A slurry of DHT-4V in process solvent was added prior to the first V/L separator. The molar amount of DHT-4V added was about 10-fold higher than the molar amount of chlorides added to the process; the chlorides added were titanium tetrachloride and tertiary butyl chloride.

Prior to pelletization the ethylene interpolymer product was stabilized by adding about 500 ppm of Irganox 1076 (a primary antioxidant) and about 500 ppm of Irgafos 168 (a secondary antioxidant), based on weight of the ethylene interpolymer product. Antioxidants were dissolved in process solvent and added between the first and second V/L separators.

Tables 2B and 2C disclose additional solution process parameters, e.g. ethylene and 1-octene splits between the reactors, reactor temperatures and ethylene conversions, etc. recorded during the production of Example 81 and Comparative Example 20. In Comparative Example 20, the single-site catalyst formulation was injected into both reactor R1 and reactor R2 and $ES^{R1}$ was 45%, i.e. percent of ethylene allocated to reactor 1. In Example 81, the single site catalyst formulation was injected into R1, the in-line Ziegler-Natta catalyst formulation was injected into R2 and $ES^{R1}$ was 35%.

TABLE 1

Computer generated Simulated Example 13: single-site catalyst formulation in R1 (PIC-1) and an in-line Ziegler-Natta catalyst formulation in R2 and R3.

| Simulated Physical Property | Reactor 1 (R1) First Ethylene Interpolymer | Reactor 2 (R2) Second Ethylene Interpolymer | Reactor 3 (R3) Third Ethylene Interpolymer | Simulated Example 13 |
|---|---|---|---|---|
| Weight Percent (%) | 36.2 | 56.3 | 7.5 | 100 |
| $M_n$ | 63806 | 25653 | 20520 | 31963 |
| $M_w$ | 129354 | 84516 | 67281 | 99434 |
| $M_z$ | 195677 | 198218 | 162400 | 195074 |
| Polydispersity ($M_w/M_n$) | 2.03 | 3.29 | 3.28 | 3.11 |
| Branch Frequency ($C_6$ Branches per 1000 C) | 12.6 | 11.4 | 15.6 | 12.1 |
| $CDBI_{50}$ (%) (range) | 90 to 95 | 55 to 60 | 45 to 55 | 65 to 70 |
| Density (g/cm$^3$) | 0.9087 | 0.9206 | 0.9154 | 0.9169 |
| Melt Index (dg/min) | 0.31 | 1.92 | 4.7 | 1.0 |

TABLE 2A

Continuous solution polymerization process parameters for ethylene interpolymer products Examples 81 and 91 and Comparative Example 20 and Comparative Example 30.

| Sample Code | Example 81 | Comparative Example 20 | Example 91 | Comparative Example 30 |
|---|---|---|---|---|
| R1 Catalyst | PIC-1 | PIC-1 | PIC-1 | PIC-1 |
| R2 Catalyst | ZN | PIC-1 | ZN | PIC-1 |
| R1 (i) (ppm) | 0.13 | 0.08 | 0.31 | 0.14 |
| R1 (ii)/(i) mole ratio | 100.0 | 100.0 | 100.0 | 100.0 |
| R1 (iv)/(ii) mole ratio | 0.0 | 0.3 | 0.0 | 0.3 |
| R1 (iii)/(i) mole ratio | 1.10 | 1.2 | 1.10 | 1.17 |
| R2 (i) (ppm) | 0 | 0.22 | 0 | 0.45 |
| R2 (ii)/(i) mole ratio | 0 | 25 | 0 | 25 |
| R2 (iv)/(ii) mole ratio | 0 | 0.3 | 0 | 0.3 |
| R2 (iii)/(i) mole ratio | 0 | 1.27 | 0 | 1.5 |
| R2 (vii) (ppm) | 3.99 | 0 | 4.50 | 0 |
| R2 (vi)/(v) mole ratio | 1.83 | 0 | 1.83 | 0 |
| R2 (viii)/(vii) mole ratio | 1.35 | 0 | 1.35 | 0 |
| R2 (ix)/(vii) mole ratio | 0.35 | 0 | 0.35 | 0 |
| Prod. Rate (kg/h) | 93.5 | 74.0 | 93.3 | 81.2 |

TABLE 2B

Additional solution process parameters for ethylene interpolymer products Examples 81 and 91 and Comparative Example 20 and Comparative Example 30.

| Sample Code | Example 81 | Comparative Example 20 | Example 91 | Comparative Example 30 |
|---|---|---|---|---|
| R3 volume (L) | 18 | 18 | 18 | 18 |
| $ES^{R1}$ (%) | 35 | 45 | 40 | 45 |
| $ES^{R2}$ (%) | 65 | 55 | 60 | 55 |
| $ES^{R3}$ (%) | 0 | 0 | 0 | 0 |

TABLE 2B-continued

Additional solution process parameters for ethylene interpolymer products Examples 81 and 91 and Comparative Example 20 and Comparative Example 30.

| Sample Code | Example 81 | Comparative Example 20 | Example 91 | Comparative Example 30 |
|---|---|---|---|---|
| R1 ethylene concentration (wt %) | 9.69 | 9.5 | 10.49 | 10.8 |
| R2 ethylene concentration (wt %) | 16.1 | 13.3 | 16.0 | 14.4 |
| R3 ethylene concentration (wt %) | 16.1 | 13.3 | 16.0 | 14.4 |
| ((octene)/(ethylene)) in R1 (wt %) | 0.03 | 0.044 | 0.014 | 0.007 |
| $OS^{R1}$ (%) | 100 | 100 | 100 | 100 |
| $OS^{R2}$ (%) | 0 | 0 | 0 | 0 |
| $OS^{R3}$ (%) | 0 | 0 | 0 | 0 |
| $H_2^{R1}$ (ppm) | 0.50 | 1.65 | 2.40 | 2.94 |
| $H_2^{R2}$ (ppm) | 80.0 | 27.90 | 79.97 | 10.59 |
| $H_2^{R3}$ (ppm) | 0 | 0 | 0 | 0 |
| Prod. Rate (kg/h) | 93.5 | 74.0 | 93.3 | 81.2 |

TABLE 2C

Additional solution process parameters for ethylene interpolymer products Examples 81 and 91 and Comparative Example 20 and Comparative Example 30.

| Sample Code | Example 81 | Comparative Example 20 | Example 91 | Comparative Example 30 |
|---|---|---|---|---|
| R1 total solution rate (kg/h) | 342.2 | 379.2 | 358.6 | 359.9 |
| R2 total solution rate (kg/h) | 257.8 | 220.8 | 241.4 | 240.1 |
| R3 solution rate (kg/h) | 0 | 0 | 0 | 0 |
| Overall total solution rate (kg/h) | 600.0 | 600 | 600.0 | 600 |
| R1 inlet temp (° C.) | 30 | 30 | 30 | 30 |
| R2 inlet temp (° C.) | 30 | 30 | 30 | 30 |
| R3 inlet temp (° C.) | 130 | 130 | 130 | 130 |
| R1 Mean temp (° C.) | 153.0 | 144.0 | 162.4 | 162.3 |
| R2 Mean temp (° C.) | 211.6 | 186.6 | 212.1 | 202.2 |
| R3 exit temp (actual) (° C.) | 221.3 | 188.4 | 222.4 | 206.6 |
| R3 exit temp (calc) (° C.) | 224.4 | 191.5 | 224.4 | 205.2 |
| $Q^{R1}$ (%) | 91.5 | 90.0 | 90.9 | 93.0 |
| $Q^{R2}$ (%) | 79.7 | 79.0 | 78.7 | 83.0 |
| $Q^{R2+R3}$ (%) | 90.9 | 87.3 | 90.9 | 89.1 |
| $Q^{R3}$ (%) | 55.1 | 39.3 | 57.1 | 36.1 |
| $Q^{T}$ (%) | 93.8 | 92.4 | 94.2 | 93.7 |
| Prod. Rate (kg/h) | 93.5 | 74.0 | 93.3 | 81.2 |

TABLE 3

Physical properties of ethylene interpolymer product Examples 81 and 91 and Comparative Q, V, R, Y and X.

| Sample Code | Example 81 | Comp. Q | Comp. V | Example 91 | Comp. R | Comp. Y | Comp. X |
|---|---|---|---|---|---|---|---|
| Density (g/cm³) | 0.9533 | 0.9530 | 0.9550 | 0.9589 | 0.9580 | 0.9600 | 0.9490 |
| Melt Index, $I_2$ (dg/min) | 1.61 | 1.40 | 1.50 | 6.72 | 7.03 | 8.52 | 10.9 |
| Melt Flow Ratio ($I_{21}/I_2$) | 50 | 57 | 66 | 30.4 | 37 | 26.1 | 22.4 |
| Stress Exponent | 1.43 | 1.35 | 1.58 | 1.29 | 1.32 | 1.29 | 1.23 |
| Zero Shear Viscosity 190° C. (Pa-s) | 7959 | 6249 | 9733 | 1424 | 1464 | 1924 | 1080 |
| Crossover Frequency 190° C. (rad/s) | 69.89 | 58.51 | 43.45 | 431.6 | 298.3 | 431.1 | 568.9 |
| G'[@ G" = 500 Pa] (Pa) | 64 | 38 | 74 | 32 | 38 | 102 | 62 |
| Comonomer | Octene | octene | hexene | Octene | octene | | butene |
| Comonomer Content (mole %) | 0.3 | 0.5 | 0.5 | 0.2 | 0.3 | 0.0 | 0.5 |
| Internal Unsat/100 C. | 0.002 | 0.002 | 0.000 | 0.002 | 0.005 | 0.004 | 0.001 |
| Side Chain Unsat/100 C. | 0.0 | 0.0 | 0.009 | 0.0 | 0.0 | 0.0 | 0.0 |
| Terminal Unsat/100 C. | 0.044 | 0.008 | 0.017 | 0.041 | 0.01 | 0.017 | 0.017 |
| Ti (ppm) | 6.4 | 0.35$^a$ | 0.95 | 6.7 | 0.35$^a$ | 10.7 | 7.3 |
| $M_w$ | 98234 | 91691 | 106992 | 66128 | 62792 | 63567 | 61071 |
| $M_z$ | 357665 | 277672 | 533971 | 167030 | 162875 | 181472 | 153014 |
| Polydispersity Index ($M_w/M_n$) | 5.62 | 7.38 | 10.45 | 3.54 | 4.41 | 3.73 | 2.99 |
| VICAT Soft. Pt. (° C.): Plaque | 129.1 | 126.4 | 126.8 | 129.3 | 127.0 | | 124.5 |
| ¹Elong. at Yield (%) | 9 | 9 | 9 | 8 | 9 | 8 | 9 |
| ¹Yield Strength (MPa) | 27.3 | 27.0 | 28.5 | 30.0 | 29.5 | 31.0 | 25.4 |

TABLE 3-continued

Physical properties of ethylene interpolymer product Examples 81 and 91 and Comparative Q, V, R, Y and X.

| Sample Code | Example 81 | Comp. Q | Comp. V | Example 91 | Comp. R | Comp. Y | Comp. X |
|---|---|---|---|---|---|---|---|
| [1]Ultimate Elong. (%) | 958 | 899 | 870 | 1109 | 891 | 763 | 1143 |
| [1]Ultimate Strength (MPa) | 35.9 | 31.4 | 26.8 | 22.4 | 19.0 | 16.0 | 16.8 |
| [1]Sec Mod 1% (MPa) | 1720 | 1393 | 1036 | 1813 | 1852 | 1746 | 1171 |
| [1]Sec Mod 2% (MPa) | 1052 | 944 | 904 | 1158 | 1154 | 1155 | 857 |
| [2]Flex Secant Mod. 1% (MPa) | 1305 | 1272 | 1372 | 1531 | 1352 | 1599 | 1161 |
| [2]Flex Secant Mod. 2% (MPa) | 1091 | 1070 | 1167 | 1272 | 1160 | 1361 | 1008 |
| [2]Flex Tangent Mod. (MPa) | 1619 | 1630 | 1636 | 1881 | 1605 | 1870 | 1356 |
| [2]Flexural Strength (MPa) | 37.9 | 37.2 | 40.4 | 41.9 | 40.1 | 44.6 | 36.0 |
| Izod Impact (ft-lb/in) | 1.6 | 1.5 | 1.5 | 1.0 | 0.9 | 0.7 | |

[a]average: database on Ti (ppm) in SURPASS ® products (NOVA Chemicals)
[1]As determined by ASTM D882-12
[2]As determined by ASTM D790-10

TABLE 4

Dilution Index ($Y_d$) and Dimensionless Modulus Data ($X_d$) for selected embodiments of ethylene interpolymers of this disclosure (Examples), relative to Comparative S, A, D and E. (MFR = melt flow rate ($I_{21}/I_2$); MS = melt strength)

| Sample Code | Density [g/cm³] | MI [dg/min] | MFR | MS [cN] | $\eta_0$ [kPa·s] | $G^0_N$ [MPa] | $G^*_c$ [kPa] | $\delta_c$ [°] | $X_d$ | $Y_d$ |
|---|---|---|---|---|---|---|---|---|---|---|
| Comp. S | 0.9176 | 0.86 | 29.2 | 6.46 | 11.5 | 1.50 | 9.43 | 74.0 | 0.00 | 0.02 |
| Comp. A | 0.9199 | 0.96 | 29.6 | 5.99 | 10.6 | 1.17 | 5.89 | 80.1 | −0.20 | 3.66 |
| Example 6 | 0.9152 | 0.67 | 23.7 | 7.05 | 12.9 | 1.57 | 7.89 | 79.6 | −0.08 | 4.69 |
| Example 101 | 0.9173 | 0.95 | 26.3 | 5.73 | 9.67 | 0.84 | 7.64 | 79.0 | −0.09 | 3.93 |
| Example 102 | 0.9176 | 0.97 | 22.6 | 5.65 | 9.38 | 1.46 | 7.46 | 79.5 | −0.10 | 4.29 |
| Example 103 | 0.9172 | 0.96 | 25.3 | 5.68 | 9.38 | 1.44 | 7.81 | 79.3 | −0.08 | 4.29 |
| Example 110 | 0.9252 | 0.98 | 23.9 | 5.57 | 9.41 | 1.64 | 8.90 | 78.1 | −0.03 | 3.8 |
| Example 115 | 0.9171 | 0.75 | 23.4 | 6.83 | 12.4 | 1.48 | 8.18 | 79.2 | −0.06 | 4.44 |
| Example 200 | 0.9250 | 1.04 | 24.2 | 5.33 | 8.81 | 0.97 | 8.97 | 78.9 | −0.02 | 4.65 |
| Example 201 | 0.9165 | 1.01 | 27.1 | 5.43 | 8.75 | 0.85 | 6.75 | 79.7 | −0.15 | 3.91 |
| Example 120 | 0.9204 | 1.00 | 24.0 | 5.99 | 10.2 | 1.45 | 13.5 | 73.6 | 0.16 | 1.82 |
| Example 130 | 0.9232 | 0.94 | 22.1 | 6.21 | 10.4 | 0.97 | 11.6 | 75.7 | 0.09 | 3.02 |
| Example 131 | 0.9242 | 0.95 | 22.1 | 6.24 | 10.7 | 1.02 | 11.6 | 75.3 | 0.09 | 2.59 |
| Comp. D | 0.9204 | 0.82 | 30.6 | 7.61 | 15.4 | 1.58 | 10.8 | 70.4 | 0.06 | −2.77 |
| Comp. E | 0.9161 | 1.00 | 30.5 | 7.06 | 13.8 | 1.42 | 10.4 | 70.5 | 0.04 | −2.91 |

TABLE 5A

Unsaturation data of several embodiments of the disclosed ethylene interpolymers, as well as Comparative B, C, E, E2, G, H, H2, I and J; as determined by ASTM D3124-98 and ASTM D6248-98.

| Sample Code | Density (g/cm³) | Melt Index $I_2$ (dg/min) | Melt Flow Ratio ($I_{21}/I_2$) | Stress Exponent | Unsaturations per 100 C. | | |
|---|---|---|---|---|---|---|---|
| | | | | | Internal | Side Chain | Terminal |
| Example 11 | 0.9113 | 0.91 | 24.8 | 1.24 | 0.009 | 0.004 | 0.037 |
| Example 6 | 0.9152 | 0.67 | 23.7 | 1.23 | 0.008 | 0.004 | 0.038 |
| Example 4 | 0.9154 | 0.97 | 37.1 | 1.33 | 0.009 | 0.004 | 0.047 |
| Example 7 | 0.9155 | 0.70 | 25.7 | 1.24 | 0.008 | 0.005 | 0.042 |
| Example 2 | 0.9160 | 1.04 | 27.0 | 1.26 | 0.009 | 0.005 | 0.048 |
| Example 5 | 0.9163 | 1.04 | 25.9 | 1.23 | 0.008 | 0.005 | 0.042 |
| Example 3 | 0.9164 | 0.9 | 29.2 | 1.27 | 0.009 | 0.004 | 0.049 |
| Example 53 | 0.9164 | 0.9 | 29.2 | 1.27 | 0.009 | 0.004 | 0.049 |
| Example 51 | 0.9165 | 1.01 | 28.0 | 1.26 | 0.009 | 0.003 | 0.049 |
| Example 201 | 0.9165 | 1.01 | 27.1 | 1.22 | 0.008 | 0.007 | 0.048 |
| Example 1 | 0.9169 | 0.88 | 23.4 | 1.23 | 0.008 | 0.005 | 0.044 |
| Example 52 | 0.9169 | 0.85 | 29.4 | 1.28 | 0.008 | 0.002 | 0.049 |
| Example 55 | 0.9170 | 0.91 | 29.8 | 1.29 | 0.009 | 0.004 | 0.050 |
| Example 115 | 0.9171 | 0.75 | 23.4 | 1.22 | 0.007 | 0.003 | 0.041 |
| Example 43 | 0.9174 | 1.08 | 24.2 | 1.23 | 0.007 | 0.007 | 0.046 |
| Comparative E2 | 0.9138 | 1.56 | 24.1 | 1.26 | 0.006 | 0.007 | 0.019 |
| Comparative E | 0.9144 | 1.49 | 25.6 | 1.29 | 0.004 | 0.005 | 0.024 |
| Comparative J | 0.9151 | 4.2 | 21.8 | 1.2 | 0.006 | 0.002 | 0.024 |
| Comparative C | 0.9161 | 1 | 30.5 | 1.35 | 0.004 | 0.004 | 0.030 |
| Comparative B | 0.9179 | 1.01 | 30.2 | 1.33 | 0.004 | 0.002 | 0.025 |
| Comparative H2 | 0.9189 | 0.89 | 30.6 | 1.36 | 0.004 | 0.002 | 0.021 |
| Comparative H | 0.9191 | 0.9 | 29.6 | 1.34 | 0.004 | 0.003 | 0.020 |

TABLE 5A-continued

Unsaturation data of several embodiments of the disclosed ethylene interpolymers, as well as Comparative B, C, E, E2, G, H, H2, I and J; as determined by ASTM D3124-98 and ASTM D6248-98.

| Sample Code | Density (g/cm³) | Melt Index $I_2$ (dg/min) | Melt Flow Ratio ($I_{21}/I_2$) | Stress Exponent | Unsaturations per 100 C. Internal | Side Chain | Terminal |
|---|---|---|---|---|---|---|---|
| Comparative I | 0.9415 | 0.87 | 62 | 1.61 | 0.002 | 0.000 | 0.025 |
| Comparative G | 0.9612 | 0.89 | 49 | 1.58 | 0.000 | 0.000 | 0.023 |

TABLE 5B

Additional unsaturation data of several embodiments of the disclosed ethylene interpolymers; as determined by ASTM D3124-98 and ASTM D6248-98.

| Sample Code | Density (g/cm³) | Melt Index $I_2$ (dg/min) | Melt Flow Ratio ($I_{21}/I_2$) | S. Ex. | Unsaturations per 100 C. Internal | Side Chain | Terminal |
|---|---|---|---|---|---|---|---|
| Example 8 | 0.9176 | 4.64 | 27.2 | 1.25 | 0.009 | 0.001 | 0.048 |
| Example 42 | 0.9176 | 0.99 | 23.9 | 1.23 | 0.007 | 0.006 | 0.046 |
| Example 102 | 0.9176 | 0.97 | 22.6 | 1.24 | 0.007 | 0.005 | 0.044 |
| Example 54 | 0.9176 | 0.94 | 29.9 | 1.29 | 0.009 | 0.002 | 0.049 |
| Example 41 | 0.9178 | 0.93 | 23.8 | 1.23 | 0.007 | 0.006 | 0.046 |
| Example 44 | 0.9179 | 0.93 | 23.4 | 1.23 | 0.007 | 0.007 | 0.045 |
| Example 9 | 0.9190 | 0.91 | 40.3 | 1.38 | 0.008 | 0.003 | 0.052 |
| Example 200 | 0.9250 | 1.04 | 24.2 | 1.24 | 0.006 | 0.005 | 0.050 |
| Example 60 | 0.9381 | 4.57 | 22.2 | 1.23 | 0.005 | 0.002 | 0.053 |
| Example 61 | 0.9396 | 4.82 | 20.2 | 1.23 | 0.002 | 0.002 | 0.053 |
| Example 62 | 0.9426 | 3.5 | 25.4 | 1.26 | 0.002 | 0.002 | 0.052 |
| Example 70 | 0.9468 | 1.9 | 32.3 | 1.34 | 0.001 | 0.002 | 0.042 |
| Example 71 | 0.9470 | 1.61 | 34.8 | 1.35 | 0.001 | 0.001 | 0.048 |
| Example 72 | 0.9471 | 1.51 | 31.4 | 1.34 | 0.001 | 0.002 | 0.043 |
| Example 73 | 0.9472 | 1.51 | 31.6 | 1.35 | 0.001 | 0.002 | 0.047 |
| Example 80 | 0.9528 | 1.53 | 41.1 | 1.38 | 0.002 | 0.000 | 0.035 |
| Example 81 | 0.9533 | 1.61 | 50 | 1.43 | 0.002 | 0.000 | 0.044 |
| Example 82 | 0.9546 | 1.6 | 59.6 | 1.5 | 0.001 | 0.000 | 0.045 |
| Example 90 | 0.9588 | 7.51 | 29 | 1.28 | 0.001 | 0.000 | 0.042 |
| Example 91 | 0.9589 | 6.72 | 30.4 | 1.29 | 0.002 | 0.000 | 0.041 |
| Example 20 | 0.9596 | 1.21 | 31.3 | 1.35 | 0.002 | 0.001 | 0.036 |
| Example 21 | 0.9618 | 1.31 | 38.3 | 1.39 | 0.002 | 0.001 | 0.037 |
| Example 22 | 0.9620 | 1.3 | 51 | 1.49 | 0.002 | 0.001 | 0.041 |
| Example 23 | 0.9621 | 0.63 | 78.9 | 1.68 | 0.002 | 0.001 | 0.042 |
| Example 24 | 0.9646 | 1.98 | 83 | 1.79 | 0.001 | 0.001 | 0.052 |

TABLE 6A

Neutron Activation Analysis (NAA) catalyst residues in several embodiments of the disclosed ethylene interpolymers, as well as Comparatives G, I, J, B, C, E, E2, H and H2.

| Sample Code | Density (g/cm³) | Melt Index $I_2$ (dg/min) | N.A.A. Elemental Analysis (ppm) Ti | Mg | Cl | Al |
|---|---|---|---|---|---|---|
| Example 60 | 0.9381 | 4.57 | 9.0 | 140 | 284 | 127 |
| Example 62 | 0.9426 | 3.50 | 9.2 | 179 | 358 | 94 |
| Example 70 | 0.9468 | 1.90 | 6.2 | 148 | 299 | 99 |
| Example 71 | 0.9470 | 1.61 | 6.8 | 168 | 348 | 87 |
| Example 72 | 0.9471 | 1.51 | 5.8 | 178 | 365 | 88 |
| Example 73 | 0.9472 | 1.51 | 7.2 | 142 | 281 | 66 |
| Example 80 | 0.9528 | 1.53 | 4.3 | 141 | 288 | 82 |
| Example 81 | 0.9533 | 1.61 | 6.4 | 163 | 332 | 82 |
| Example 82 | 0.9546 | 1.60 | 5.8 | 132 | 250 | 95 |
| Example 90 | 0.9588 | 7.51 | 6.7 | 143 | 286 | 94 |
| Example 91 | 0.9589 | 6.72 | 6.7 | 231 | 85 | 112 |
| Example 1 | 0.9169 | 0.88 | 6.1 | 199 | 99 | 97 |
| Example 2 | 0.9160 | 1.04 | 7.4 | 229 | 104 | 112 |
| Example 3 | 0.9164 | 0.90 | 7.3 | 268 | 137 | 129 |
| Comparative G | 0.9612 | 0.89 | 1.6 | 17.2 | 53 | 11 |
| Comparative I | 0.9415 | 0.87 | 2.3 | 102 | 24 | 53 |
| Comparative J | 0.9151 | 4.20 | 1.4 | <2 | 0.6 | 7.9 |
| Comparative B | 0.9179 | 1.01 | 0.3 | 13.7 | 47 | 9.3 |
| Comparative C | 0.9161 | 1.00 | 2.0 | 9.0 | 25 | 5.4 |
| Comparative E2 | 0.9138 | 1.56 | 1.2 | 9.8 | 32.2 | 6.8 |
| Comparative E | 0.9144 | 1.49 | 1.3 | 14.6 | 48.8 | 11.3 |
| Comparative H | 0.9191 | 0.90 | 2.2 | 14.6 | 48.8 | 11.3 |
| Comparative H2 | 0.9189 | 0.89 | 2.2 | 253 | 122 | 130 |

TABLE 6B

Additional Neutron Activation Analysis (NAA) catalyst residues in several embodiments of the disclosed ethylene interpolymers.

| Sample Code | Density (g/cm³) | Melt Index $I_2$ (dg/min) | N.A.A. Elemental Analysis (ppm) Ti | Mg | Cl | Al |
|---|---|---|---|---|---|---|
| Example 4 | 0.9154 | 0.97 | 9.6 | 287 | 45 | 140 |
| Example 5 | 0.9163 | 1.04 | 6.7 | 261 | 70 | 131 |

TABLE 6B-continued

Additional Neutron Activation Analysis (NAA) catalyst residues in several embodiments of the disclosed ethylene interpolymers.

| Sample Code | Density (g/cm³) | Melt Index I₂ (dg/min) | Ti | Mg | Cl | Al |
|---|---|---|---|---|---|---|
| Example 6 | 0.9152 | 0.67 | 5.2 | 245 | 48 | 119 |
| Example 7 | 0.9155 | 0.70 | 7.7 | 365 | 102 | 177 |
| Example 8 | 0.9176 | 4.64 | 7.6 | 234 | 86 | 117 |
| Example 9 | 0.9190 | 0.91 | 6.4 | 199 | 78 | 99 |
| Example 51 | 0.9165 | 1.01 | 5.9 | 207 | 73 | 106 |
| Example 52 | 0.9169 | 0.85 | 5.2 | 229 | 104 | 112 |
| Example 53 | 0.9164 | 0.90 | 7.3 | 347 | 101 | 167 |
| Example 54 | 0.9176 | 0.94 | 7.5 | 295 | 100 | 146 |
| Example 55 | 0.9170 | 0.91 | 7.1 | 189 | 101 | 90 |
| Example 41 | 0.9178 | 0.93 | 7.2 | 199 | 103 | 92 |
| Example 42 | 0.9176 | 0.99 | 7.5 | 188 | 104 | 86 |
| Example 43 | 0.9174 | 1.08 | 7.4 | 192 | 101 | 91 |
| Example 44 | 0.9179 | 0.93 | 7.2 | 230 | 121 | 110 |
| Example 102 | 0.9176 | 0.97 | 9.5 | 239 | 60 | 117 |
| Example 115 | 0.9171 | 0.75 | 5.1 | 258 | 115 | 130 |
| Example 61 | 0.9396 | 4.82 | 8.3 | 352 | 96 | 179 |
| Example 10 | 0.9168 | 0.94 | 7.8 | 333 | 91 | 170 |
| Example 120 | 0.9204 | 1.00 | 7.3 | 284 | 75 | 149 |
| Example 130 | 0.9232 | 0.94 | 5.8 | 292 | 114 | 147 |
| Example 131 | 0.9242 | 0.95 | 8.6 | 81.4 | 173 | 94 |
| Example 200 | 0.9250 | 1.04 | 6.3 | 90.1 | 190 | 104 |

What is claims is:

1. A cap or a closure comprising at least one layer comprising an ethylene interpolymer product comprising:
    (i) a first ethylene interpolymer;
    (ii) a second ethylene interpolymer, and;
    (iii) optionally a third ethylene interpolymer;
    wherein said ethylene interpolymer product has a Dilution Index, $Y_d$, greater than 0.

2. The cap or closure of claim 1, further characterized as having ≥0.03 terminal vinyl unsaturations per 100 carbon atoms.

3. The cap or closure of claim 1, further characterized as having ≥3 parts per million (ppm) of a total catalytic metal.

4. The cap or closure of claim 1, further characterized as having a Dimensionless Modulus, $X_d$, greater than 0.

5. The cap or closure of claim 1, further characterized as having ≥0.03 terminal vinyl unsaturations per 100 carbons and ≥3 parts per million (ppm) of total catalytic metal.

6. The cap or closure of claim 1, further characterized as having ≥3 parts per million (ppm) of total catalytic metal and a Dimensionless Modulus, $X_d$, greater than 0.

7. The cap or closure of claim 1, further characterized as having ≥0.03 terminal vinyl unsaturations per 100 carbons and a Dimensionless Modulus, $X_d$, greater than 0.

8. The cap or closure of claim 1, further characterized as having ≥0.03 terminal vinyl unsaturations per 100 carbons, ≥3 parts per million (ppm) of total catalytic metal and a Dimensionless Modulus, $X_d$, greater than 0.

9. The cap or closure of claim 1 having a melt index from about 0.4 to about 20 dg/minute; wherein melt index is measured according to ASTM D1238 (2.16 kg load and 190° C.).

10. The cap or closure of claim 1 having a density from about 0.948 to about 0.968 g/cc; wherein density is measured according to ASTM D792.

11. The cap or closure of claim 1 having a $M_w/M_n$ from about 2 to about 25.

12. The cap or closure of claim 1 having a $CDBI_{50}$ from about 54% to about 98%.

13. The cap or closure of claim 1; wherein
    (i) said first ethylene interpolymer is from about 15 to about 60 weight percent of said ethylene interpolymer product;
    (ii) said second ethylene interpolymer is from about 30 to about 85 weight percent of said ethylene interpolymer product, and;
    (iii) optionally said third ethylene interpolymer is from about 0 to about 30 weight percent of said ethylene interpolymer product;
    wherein weight percent is the weight of said first, said second or said optional third ethylene interpolymer divided by the weight of said ethylene interpolymer product.

14. The cap or closure of claim 1; wherein
    (i) said first ethylene interpolymer has a melt index from about 0.01 to about 200 dg/minute;
    (ii) said second ethylene interpolymer has melt index from about 0.3 to about 1000 dg/minute, and;
    (iii) optionally said third ethylene interpolymer has a melt index from about 0.5 to about 2000 dg/minute;
    wherein melt index is measured according to ASTM D1238 (2.16 kg load and 190° C.).

15. The cap or closure of claim 1; wherein
    (i) said first ethylene interpolymer has a density from about 0.855 g/cm³ to about 0.975 g/cc;
    (ii) said second ethylene interpolymer has a density from about 0.89 g/cm³ to about 0.975 g/cc, and;
    (iii) optionally said third ethylene interpolymer has density from about 0.89 to about 0.975 g/cc;
    wherein density is measured according to ASTM D792.

16. The cap or closure of claim 1; wherein said ethylene interpolymer product is synthesized using a solution polymerization process.

17. The cap or closure of claim 1 further comprising from 0 to about 1.0 mole percent of one or more α-olefin.

18. The cap or closure of claim 17; wherein said one or more α-olefin are $C_3$ to $C_{10}$ α-olefins.

19. The cap or closure of claim 17; wherein said one or more α-olefin is 1-hexene, 1-octene or a mixture of 1-hexene and 1-octene.

20. The cap or closure of claim 1; wherein said first ethylene interpolymer is synthesized using a single-site catalyst formulation.

21. The cap or closure of claim 1; wherein said second ethylene interpolymer is synthesized using a first heterogeneous catalyst formulation.

22. The cap or closure of claim 1; wherein said third ethylene interpolymer is synthesized using a first heterogeneous catalyst formulation or a second heterogeneous catalyst formulation.

23. The cap or closure of claim 1 wherein said second ethylene interpolymer is synthesized using a first in-line Ziegler Natta catalyst formulation or a first batch Ziegler-Natta catalyst formulation; optionally, said third ethylene interpolymer is synthesized using said first in-line Ziegler Natta catalyst formulation or said first batch Ziegler-Natta catalyst formulation.

24. The cap or closure of claim 1 wherein said third ethylene interpolymer is synthesized using a second in-line Ziegler Natta catalyst formulation or a second batch Ziegler-Natta catalyst formulation.

25. The cap or closure of claim 1, having ≤1 part per million (ppm) of a metal A; wherein said metal A originates from a single site catalyst formulation used to synthesize said first ethylene interpolymer.

26. The cap or closure of claim 25; wherein said metal A is titanium, zirconium or hafnium.

27. The cap or closure of claim 1 having a metal B and optionally a metal C and the total amount of said metal B plus said metal C is from about 3 to about 11 parts per million; wherein said metal B originates from a first heterogeneous catalyst formulation used to synthesize said second ethylene interpolymer and optionally said metal C originates from a second heterogeneous catalyst formulation used to synthesize said third ethylene interpolymer; optionally said metal B and said metal C are the same metal.

28. The cap or closure of claim 27; wherein said metal B and said metal C, are independently selected from titanium, zirconium, hafnium, vanadium, niobium, tantalum, chromium, molybdenum, tungsten, manganese, technetium, rhenium, iron, ruthenium or osmium.

29. The cap or closure of claim 27; wherein said metal B and said metal C, are independently selected from titanium, zirconium, hafnium, vanadium or chromium.

30. The cap or closure of claim 1 wherein said first ethylene interpolymer has a first $M_w/M_n$, said second ethylene interpolymer has a second $M_w/M_n$ and said optional third ethylene interpolymer has a third $M_w/M_n$; wherein said first $M_w/M_n$ is lower than said second $M_w/M_n$ and said optional third $M_w/M_n$.

31. The cap or closure of claim 30; wherein the blending of said second ethylene interpolymer and said third ethylene interpolymer forms a heterogeneous ethylene interpolymer blend having a fourth $M_w/M_n$; wherein said fourth $M_w/M_n$ is not broader than said second $M_w/M_n$.

32. The cap or closure of claim 30 wherein said second $M_w/M_n$ and said optional third $M_w/M_n$ are ≤4.0.

33. The cap or closure of claim 1; wherein said first ethylene interpolymer has a first $CDBI_{50}$ from about 70 to about 98%, said second ethylene interpolymer has a second $CDBI_{50}$ from about 45 to about 98% and said optional third ethylene interpolymer has a third $CDBI_{50}$ from about 35 to about 98%.

34. The cap or closure of claim 33; wherein said first $CDBI_{50}$ is higher than said second $CDBI_{50}$; optionally said first $CDBI_{50}$ is higher than said third $CDBI_{50}$.

35. The cap or closure of claim 1; having a melt index from ≥0.4 dg/min to ≤5.0 dg/min and a G'[@G"=500 Pa] from ≥40 Pa to ≤70 Pa.

36. The cap or closure of claim 1; having a melt index from >5.0 dg/min to ≤20 dg/min and a G'[@G"=500 Pa] from ≥1 Pa to ≤35 Pa.

37. A cap or closure comprising at least one layer comprising an ethylene interpolymer product comprising:
(i) a first ethylene interpolymer;
(ii) a second ethylene interpolymer, and;
(iii) optionally a third ethylene interpolymer;
wherein said ethylene interpolymer product has ≥0.03 terminal vinyl unsaturations per 100 carbon atoms.

38. The cap or closure of claim 37, further characterized as having a Dilution Index, $Y_d$, greater than 0.

39. The cap or closure of claim 37, further characterized as having ≥3 parts per million (ppm) of a total catalytic metal.

40. The cap or closure of claim 37, further characterized as having a Dimensionless Modulus, $X_d$, greater than 0.

41. The cap or closure of claim 37, further characterized as having a Dilution Index, $Y_d$, greater than 0 and ≥3 parts per million (ppm) of total catalytic metal.

42. The cap or closure of claim 37, further characterized as having ≥3 parts per million (ppm) of total catalytic metal and a Dimensionless Modulus, $X_d$, greater than 0.

43. The cap or closure of claim 37 further characterized as having a Dilution Index, $Y_d$, greater than 0 and a Dimensionless Modulus, $X_d$, greater than 0.

44. The cap or closure of claim 37 further characterized as having a Dilution Index, $Y_d$, greater than 0, ≥3 parts per million (ppm) of total catalytic metal and a Dimensionless Modulus, $X_d$, greater than 0.

45. The cap or closure of claim 37 having a melt index from about 0.5 to about 15 dg/minute; wherein melt index is measured according to ASTM D1238 (2.16 kg load and 190° C.).

46. The cap or closure of claim 37 having a density from about 0.948 to about 0.968 g/cc; wherein density is measured according to ASTM D792.

47. The cap or closure of claim 37 having a $M_w/M_n$ from about 2 to about 25.

48. The cap or closure of claim 37 having a $CDBI_{50}$ from about 54% to about 98%.

49. The cap or closure of claim 37; wherein
(i) said first ethylene interpolymer is from about 15 to about 60 weight percent of said ethylene interpolymer product;
(ii) said second ethylene interpolymer is from about 30 to about 85 weight percent of said ethylene interpolymer product, and;
(iii) optionally said third ethylene interpolymer is from about 0 to about 30 weight percent of said ethylene interpolymer product;
wherein weight percent is the weight of said first, said second or said optional third ethylene interpolymer divided by the weight of said ethylene interpolymer product.

50. The cap or closure of claim 37; wherein
(i) said first ethylene interpolymer has a melt index from about 0.01 to about 200 dg/minute;
(ii) said second ethylene interpolymer has melt index from about 0.3 to about 1000 dg/minute, and;
(iii) optionally said third ethylene interpolymer has a melt index from about 0.5 to about 2000 dg/minute;
wherein melt index is measured according to ASTM D1238 (2.16 kg load and 190° C.).

51. The cap or closure of claim 37; wherein
(i) said first ethylene interpolymer has a density from about 0.855 g/cm³ to about 0.975 g/cc;
(ii) said second ethylene interpolymer has a density from about 0.89 g/cm³ to about 0.975 g/cc, and;
(iii) optionally said third ethylene interpolymer has density from about 0.89 to about 0.975 g/cc;
wherein density is measured according to ASTM D792.

52. The cap or closure of claim 37; wherein said ethylene interpolymer product is synthesized using a solution polymerization process.

53. The cap or closure of claim 37 further comprising from 0 to about 1.0 mole percent of one or more α-olefin.

54. The cap or closure of claim 53; wherein said one or more α-olefin are $C_3$ to $C_{10}$ α-olefins.

55. The cap or closure of claim 53; wherein said one or more α-olefin is 1-hexene, 1-octene or a mixture of 1-hexene and 1-octene.

56. The cap or closure of claim 37; wherein said first ethylene interpolymer is synthesized using a single-site catalyst formulation.

57. The cap or closure of claim 37; wherein said second ethylene interpolymer is synthesized using a first heterogeneous catalyst formulation.

58. The cap or closure of claim 37; wherein said third ethylene interpolymer is synthesized using a first heterogeneous catalyst formulation or a second heterogeneous catalyst formulation.

59. The cap or closure of claim 37 wherein said second ethylene interpolymer is synthesized using a first in-line Ziegler-Natta catalyst formulation or a first batch Ziegler-Natta catalyst formulation; optionally, said third ethylene interpolymer is synthesized using said first in-line Ziegler Natta catalyst formulation or said first batch Ziegler-Natta catalyst formulation.

60. The cap or closure of claim 37 wherein said third ethylene interpolymer is synthesized using a second in-line Ziegler Natta catalyst formulation or a second batch Ziegler-Natta catalyst formulation.

61. The cap or closure of claim 37, having ≤1 part per million (ppm) of a metal A; wherein said metal A originates from a single site catalyst formulation used to synthesize said first ethylene interpolymer.

62. The cap or closure of claim 61; wherein said metal A is titanium, zirconium or hafnium.

63. The cap or closure of claim 37 having a metal B and optionally a metal C and the total amount of said metal B plus said metal C is from about 3 to about 11 parts per million; wherein said metal B originates from a first heterogeneous catalyst formulation used to synthesize said second ethylene interpolymer and optionally said metal C originates from a second heterogeneous catalyst formulation used to synthesize said third ethylene interpolymer; optionally said metal B and said metal C are the same metal.

64. The cap or closure of claim 63; wherein said metal B and said metal C, are independently selected from titanium, zirconium, hafnium, vanadium, niobium, tantalum, chromium, molybdenum, tungsten, manganese, technetium, rhenium, iron, ruthenium or osmium.

65. The cap or closure of claim 63; wherein said metal B and said metal C, are independently selected from titanium, zirconium, hafnium, vanadium or chromium.

66. The cap or closure of claim 37 wherein said first ethylene interpolymer has a first $M_w/M_n$, said second ethylene interpolymer has a second $M_w/M_n$ and said optional third ethylene interpolymer has a third $M_w/M_n$; wherein said first $M_w/M_n$ is lower than said second $M_w/M_n$ and said optional third $M_w/M_n$.

67. The cap or closure of claim 66; wherein the blending of said second ethylene interpolymer and said third ethylene interpolymer forms a heterogeneous ethylene interpolymer blend having a fourth $M_w/M_n$; wherein said fourth $M_w/M_n$ is not broader than said second $M_w/M_n$.

68. The cap or closure of claim 66 wherein said second $M_w/M_n$ and said optional third $M_w/M_n$ are ≤4.0.

69. The cap or closure of claim 37; wherein said first ethylene interpolymer has a first $CDBI_{50}$ from about 70 to about 98%, said second ethylene interpolymer has a second $CDBI_{50}$ from about 45 to about 98% and said optional third ethylene interpolymer has a third $CDBI_{50}$ from about 35 to about 98%.

70. The cap or closure of claim 69; wherein said first $CDBI_{50}$ is higher than said second $CDBI_{50}$; optionally said first $CDBI_{50}$ is higher than said third $CDBI_{50}$.

71. The cap or closure of claim 37; having a melt index from ≥0.4 dg/min to ≤5.0 dg/min and a G'[@G"=500 Pa] from ≥40 Pa to ≤70 Pa.

72. The cap or closure of claim 37; having a melt index from >5.0 dg/min to ≤20 dg/min and a G'[@G"=500 Pa] from ≥1 Pa to ≤35 Pa.

73. A cap or closure comprising at least one layer comprising an ethylene interpolymer product comprising:
  (i) a first ethylene interpolymer;
  (ii) a second ethylene interpolymer, and;
  (iii) optionally a third ethylene interpolymer;
  wherein said ethylene interpolymer product has ≥3 parts per million (ppm) of a total catalytic metal.

74. The cap or closure of claim 73, further characterized as having ≥0.03 terminal vinyl unsaturations per 100 carbon atoms.

75. The cap or closure of claim 73, further characterized as having a Dilution Index, $Y_d$, greater than 0.

76. The cap or closure of claim 73, further characterized as having a Dimensionless Modulus, $X_d$, greater than 0.

77. The cap or closure of claim 73, further characterized as having ≥0.03 terminal vinyl unsaturations per 100 carbons and a Dilution Index, $Y_d$, greater than 0.

78. The cap or closure of claim 73, further characterized as having a Dilution Index, $Y_d$, greater than 0 and a Dimensionless Modulus, $X_d$, greater than 0.

79. The cap or closure of claim 73 further characterized as having ≥0.03 terminal vinyl unsaturations per 100 carbons and a Dimensionless Modulus, $X_d$, greater than 0.

80. The cap or closure of claim 73 further characterized as having ≥0.03 terminal vinyl unsaturations per 100 carbons, a Dilution Index, $Y_d$, greater than 0 and a Dimensionless Modulus, $X_d$, greater than 0.

81. The cap or closure of claim 73 having a melt index from about 0.4 to about 20 dg/minute; wherein melt index is measured according to ASTM D1238 (2.16 kg load and 190° C.).

82. The cap or closure of claim 73 having a density from about 0.948 to about 0.968 g/cc; wherein density is measured according to ASTM D792.

83. The cap or closure of claim 73 having a $M_w/M_n$ from about 2 to about 25.

84. The cap or closure of claim 73 having a $CDBI_{50}$ from about 54% to about 98%.

85. The cap or closure of claim 73; wherein
  (i) said first ethylene interpolymer is from about 15 to about 60 weight percent of said ethylene interpolymer product;
  (ii) said second ethylene interpolymer is from about 30 to about 85 weight percent of said ethylene interpolymer product, and;
  (iii) optionally said third ethylene interpolymer is from about 0 to about 30 weight percent of said ethylene interpolymer product;
  wherein weight percent is the weight of said first, said second or said optional third ethylene interpolymer divided by the weight of said ethylene interpolymer product.

86. The cap or closure of claim 73; wherein
  (i) said first ethylene interpolymer has a melt index from about 0.01 to about 200 dg/minute;
  (ii) said second ethylene interpolymer has melt index from about 0.3 to about 1000 dg/minute, and;
  (iii) optionally said third ethylene interpolymer has a melt index from about 0.5 to about 2000 dg/minute;
  wherein melt index is measured according to ASTM D1238 (2.16 kg load and 190° C.).

87. The cap or closure of claim 73; wherein
  (i) said first ethylene interpolymer has a density from about 0.855 $g/cm^3$ to about 0.975 g/cc;
  (ii) said second ethylene interpolymer has a density from about 0.89 $g/cm^3$ to about 0.975 g/cc, and;

(iii) optionally said third ethylene interpolymer has density from about 0.89 to about 0.975 g/cc;
wherein density is measured according to ASTM D792.

88. The cap or closure of claim 73; wherein said ethylene interpolymer product is synthesized using a solution polymerization process.

89. The cap or closure of claim 73 further comprising from 0 to about 1.0 mole percent of one or more α-olefin.

90. The cap or closure of claim 89; wherein said one or more α-olefin are $C_3$ to $C_{10}$ α-olefins.

91. The cap or closure of claim 89; wherein said one or more α-olefin is 1-hexene, 1-octene or a mixture of 1-hexene and 1-octene.

92. The cap or closure of claim 73; wherein said first ethylene interpolymer is synthesized using a single-site catalyst formulation.

93. The cap or closure of claim 73; wherein said second ethylene interpolymer is synthesized using a first heterogeneous catalyst formulation.

94. The cap or closure of claim 73; wherein said third ethylene interpolymer is synthesized using a first heterogeneous catalyst formulation or a second heterogeneous catalyst formulation.

95. The cap or closure of claim 73 wherein said second ethylene interpolymer is synthesized using a first in-line Ziegler-Natta catalyst formulation or a first batch Ziegler-Natta catalyst formulation; optionally, said third ethylene interpolymer is synthesized using said first in-line Ziegler Natta catalyst formulation or said first batch Ziegler-Natta catalyst formulation.

96. The cap or closure of claim 73 wherein said third ethylene interpolymer is synthesized using a second in-line Ziegler Natta catalyst formulation or a second batch Ziegler-Natta catalyst formulation.

97. The cap or closure of claim 73, having ≤1 part per million (ppm) of a metal A; wherein said metal A originates from a single site catalyst formulation used to synthesize said first ethylene interpolymer.

98. The cap or closure of claim 97; wherein said metal A is titanium, zirconium or hafnium.

99. The cap or closure of claim 73 having a metal B and optionally a metal C and the total amount of said metal B plus said metal C is from about 3 to about 11 parts per million; wherein said metal B originates from a first heterogeneous catalyst formulation used to synthesize said second ethylene interpolymer and optionally said metal C originates from a second heterogeneous catalyst formulation used to synthesize said third ethylene interpolymer; optionally said metal B and said metal C are the same metal.

100. The cap or closure of claim 99; wherein said metal B and said metal C, are independently selected from titanium, zirconium, hafnium, vanadium, niobium, tantalum, chromium, molybdenum, tungsten, manganese, technetium, rhenium, iron, ruthenium or osmium.

101. The cap or closure of claim 99; wherein said metal B and said metal C, are independently selected from titanium, zirconium, hafnium, vanadium or chromium.

102. The cap or closure of claim 73 wherein said first ethylene interpolymer has a first $M_w/M_n$, said second ethylene interpolymer has a second $M_w/M_n$ and said optional third ethylene interpolymer has a third $M_w/M_n$; wherein said first $M_w/M_n$ is lower than said second $M_w/M_n$ and said optional third $M_w/M_n$.

103. The cap or closure of claim 102; wherein the blending of said second ethylene interpolymer and said third ethylene interpolymer forms a heterogeneous ethylene interpolymer blend having a fourth $M_w/M_n$; wherein said fourth $M_w/M_n$ is not broader than said second $M_w/M_n$.

104. The cap or closure of claim 102 wherein said second $M_w/M_n$ and said optional third $M_w/M_n$ are ≤4.0.

105. The cap or closure of claim 73; wherein said first ethylene interpolymer has a first $CDBI_{50}$ from about 70 to about 98%, said second ethylene interpolymer has a second $CDBI_{50}$ from about 45 to about 98% and said optional third ethylene interpolymer has a third $CDBI_{50}$ from about 35 to about 98%.

106. The cap or closure of claim 105; wherein said first $CDBI_{50}$ is higher than said second $CDBI_{50}$; optionally said first $CDBI_{50}$ is higher than said third $CDBI_{50}$.

107. The cap or closure of claim 73; having a melt index from ≥0.4 dg/min to ≤5.0 dg/min and a G'[@G"=500 Pa] from ≥40 Pa to ≤70 Pa.

108. The cap or closure of claim 73; having a melt index from >5.0 dg/min to ≤20 dg/min and a G'[@G"=500 Pa] from ≥1 Pa to ≤35 Pa.

* * * * *

UNITED STATES PATENT AND TRADEMARK OFFICE
CERTIFICATE OF CORRECTION

PATENT NO. : 9,505,893 B2
APPLICATION NO. : 14/919119
DATED : November 29, 2016
INVENTOR(S) : XiaoChuan Wang et al.

It is certified that error appears in the above-identified patent and that said Letters Patent is hereby corrected as shown below:

In the Specification

At Column 24, Line 50, please amend the formula as follows:

$X_d = \log(G^*_{0.01\omega_c}/G^*_r)$

Signed and Sealed this
Eighth Day of May, 2018

Andrei Iancu
*Director of the United States Patent and Trademark Office*